(12) United States Patent
Takemoto

(10) Patent No.: US 10,777,497 B2
(45) Date of Patent: Sep. 15, 2020

(54) SUBSTRATE, ELECTRONIC DEVICE, AND DESIGN SUPPORT METHOD OF SUBSTRATE

(71) Applicant: FUJITSU LIMITED, Kawasaki-shi, Kanagawa (JP)

(72) Inventor: Takahito Takemoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/243,150

(22) Filed: Jan. 9, 2019

(65) Prior Publication Data
US 2019/0229049 A1  Jul. 25, 2019

(30) Foreign Application Priority Data
Jan. 25, 2018 (JP) .................. 2018-010921

(51) Int. Cl.
*H05K 1/11* (2006.01)
*H01L 23/498* (2006.01)
*H05K 1/14* (2006.01)
*G06F 30/39* (2020.01)

(52) U.S. Cl.
CPC ........ *H01L 23/49838* (2013.01); *G06F 30/39* (2020.01); *H01L 23/49827* (2013.01); *H01L 23/49833* (2013.01); *H05K 1/115* (2013.01); *H05K 1/144* (2013.01); *H05K 2201/0969* (2013.01); *H05K 2201/0979* (2013.01); *H05K 2201/09381* (2013.01); *H05K 2201/09618* (2013.01); *H05K 2201/09645* (2013.01)

(58) Field of Classification Search
CPC ... H05K 2201/0979; H05K 2201/0969; H05K 2201/09645; H05K 2201/09854; H05K 2201/09745; H05K 2201/09681; H05K 2201/09554; H05K 2201/09381; H05K 2201/09454; H05K 1/116; H05K 1/112; H05K 1/115; H05K 1/0222; H05K 3/34
See application file for complete search history.

(56) References Cited

U.S. PATENT DOCUMENTS 5,363,280 A * 11/1994 Chobot ................ H05K 1/0201
174/266
5,590,030 A * 12/1996 Kametani ............. H01L 23/467
174/252

(Continued)

FOREIGN PATENT DOCUMENTS

| JP | 2005-167140 | 6/2005 |
| JP | 2007-180076 | 7/2007 |
| JP | 2010-62530 | 3/2010 |

*Primary Examiner* — Roshn K Varghese
(74) *Attorney, Agent, or Firm* — Fujitsu Patent Center

(57) ABSTRACT

Provided is a substrate including a first wiring layer, wherein the first wiring layer has a structure in which among a plurality of first connection parts of a plurality of vias, at least one of first connection parts of two vias located closer to both ends of the first wiring layer is coupled to a body of the first wiring layer through a first conductive portion, each of the plurality of first connection parts being coupled to the first wiring layer, and a cross-sectional area of the first conductive portion is less than an area of a first part of the first wiring layer, the first part being in contact with a first connection part of a via other than the first connection parts of the two vias.

12 Claims, 18 Drawing Sheets

(56) References Cited

U.S. PATENT DOCUMENTS

| | | | |
|---|---|---|---|
| 7,152,312 B2* | 12/2006 | Gottlieb | H05K 1/116 |
| | | | 29/825 |
| 2003/0006061 A1* | 1/2003 | Brinthaupt, III | H05K 1/0201 |
| | | | 174/255 |
| 2004/0053483 A1* | 3/2004 | Nair | H01L 21/2885 |
| | | | 438/540 |
| 2007/0089903 A1* | 4/2007 | Huang | H05K 1/116 |
| | | | 174/262 |
| 2007/0136618 A1* | 6/2007 | Ohsaka | G06F 1/188 |
| | | | 713/323 |
| 2009/0000812 A1 | 1/2009 | Kariya | |
| 2009/0183899 A1* | 7/2009 | Ishida | H05K 1/0201 |
| | | | 174/252 |
| 2010/0032195 A1* | 2/2010 | Hayashi | H01L 23/49827 |
| | | | 174/260 |
| 2011/0220979 A1* | 9/2011 | Kawashima | H01L 23/50 |
| | | | 257/296 |
| 2015/0170996 A1* | 6/2015 | Altabella Lazzi | |
| | | | H01L 23/49816 |
| | | | 257/774 |
| 2016/0157336 A1* | 6/2016 | Murai | H05K 1/0234 |
| | | | 361/782 |
| 2016/0330832 A1* | 11/2016 | Kapoor | H05K 1/0209 |
| 2018/0184514 A1* | 6/2018 | Yamada | H05K 1/0265 |
| 2019/0230792 A1* | 7/2019 | Nakamoto | H01L 23/49822 |

* cited by examiner

SUBSTRATE, ELECTRONIC DEVICE, AND DESIGN SUPPORT METHOD OF SUBSTRATE

CROSS-REFERENCE TO RELATED APPLICATION

This application is based upon and claims the benefit of priority of the prior Japanese Patent Application No. 2018-010921, filed on Jan. 25, 2018, the entire contents of which are incorporated herein by reference.

FIELD

A certain aspect of the embodiments is related to a substrate, an electronic device, and a design support method of a substrate.

BACKGROUND

In a substrate having a wiring layer to which a plurality of vias are coupled, when current flows from the wiring layer to the vias, the current may crowd into a particular via, causing a break due to electromigration. Thus, a method for inhibiting current from crowding into a particular via has been suggested. One example is a method that inhibits current from crowding into the vias at both ends by making the electrical resistance of the wiring layer in the regions between the vias at both ends and the vias next to the vias at both ends greater than the electrical resistance in the remaining region as disclosed in for example, Japanese Patent Application Publication No. 2010-62530 (hereinafter, referred to as Patent Document 1).

In addition, there has been known a method that improves the supply capacity of the power source by making the thickness of a power supply layer or a ground layer provided to a printed circuit board greater than the thickness of a conductive circuit layer that is a signal line, as disclosed in, for example, Japanese Patent Application Publication No. 2005-167140 (hereinafter, referred to as Patent Document 2). There has been known a method that reduces the delay of power supply by making the pitch of a through-hole conductor located immediately below the region in which a semiconductor element is to be mounted less than the pitch of a through-hole conductor in other regions in the printed circuit board, as disclosed in, for example, Japanese Patent Application Publication No. 2007-180076 (referred to as Patent Document 3).

SUMMARY

According to a first aspect of the embodiments, there is provided a substrate including a first wiring layer, wherein the first wiring layer has a structure in which among a plurality of first connection parts of a plurality of vias, at least one of first connection parts of two vias located closer to both ends of the first wiring layer is coupled to a body of the first wiring layer through a first conductive portion, each of the plurality of first connection parts being coupled to the first wiring layer, and a cross-sectional area of the first conductive portion is less than an area of a first part of the first wiring layer, the first part being in contact with a first connection part of a via other than the first connection parts of the two vias.

According to a second aspect of the embodiments, there is provided an electronic device including a first substrate including a first wiring layer, and a second substrate coupled to the first substrate, wherein the first wiring layer has a structure in which among a plurality of first connection parts of a plurality of vias extending toward the second substrate, at least one of first connection parts of two vias located closer to both ends of the first wiring layer is coupled to a body of the first wiring layer through a first conductive portion, each of the plurality of first connection parts being coupled to the first wiring layer, and a cross-sectional area of the first conductive portion is less than an area of a first part of the first wiring layer, the first part being in contact with a first connection part of a via other than the first connection parts of the two vias.

According to a third aspect of the embodiments, there is provided a design support method of a substrate including: modifying design information on a substrate including a first wiring layer, the first wiring layer having a structure in which among a plurality of first connection parts of a plurality of vias, at least one of first connection parts of two vias located closer to both ends of the first wiring layer is coupled to a body of the first wiring layer through a first conductive portion, each of the plurality of first connection parts being coupled to the first wiring layer, wherein the modifying includes: calculating magnitudes of currents flowing from the first wiring layer to the plurality of vias with use of a computer, and when there is a via at which the magnitude of the current is greater than a predetermined value among the plurality of vias, modifying the design information so that the magnitude of the current is equal to or less than the predetermined value by making a cross-sectional area of the conductive portion less than an area of a part of the first wiring layer, the part being in contact with a first connection part of a via other than the first connection parts of the two vias with use of the computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The method described in Patent Document 1 inhibits current from crowding into the vias at both ends. However, since the width of the wiring layer is reduced, a problem of a voltage drop arises, and it becomes difficult to evenly flow the current to the vias because the current crowds into the vias next to the vias at both ends. Therefore, it is preferable to prevent the emergence of the via into which current crowds by another method.

Hereinafter, with reference to the accompanying drawings, embodiments of the present disclosure will be described.

First Embodiment

Figure 1A:
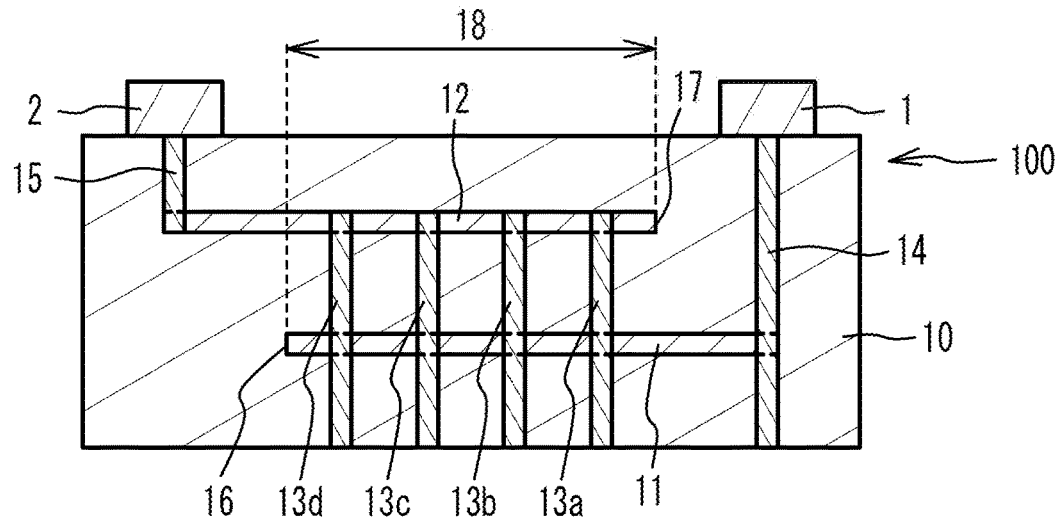
FIG. 1A is a cross-sectional view of a substrate in accordance with a first embodiment.
Figure 1B:
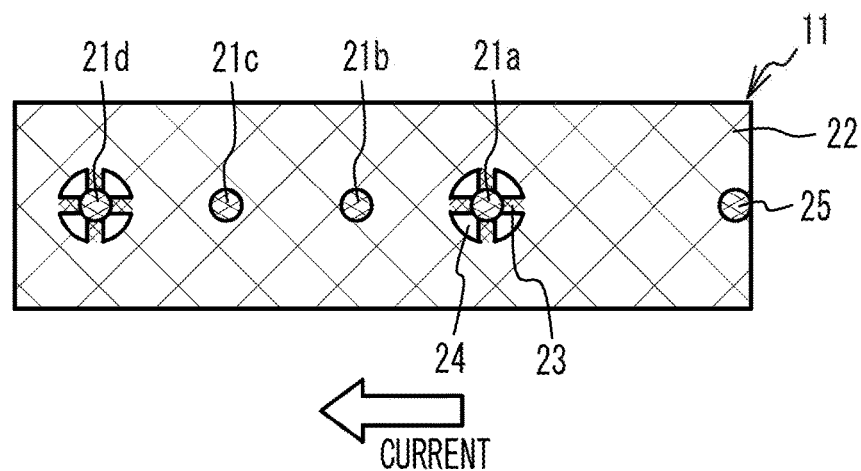
FIG. 1B and FIG. 1C are plan views of wiring layers.
Figure 1C:
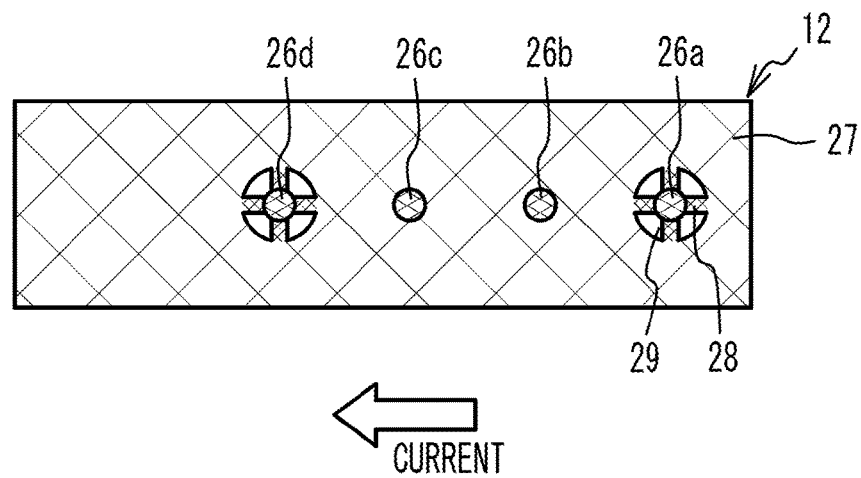

FIG. 1A is a cross-sectional view of a substrate 100 in accordance with a first embodiment, FIG. 1B is a plan view of a wiring layer 11, and FIG. 1C is a plan view of a wiring layer 12. As illustrated in FIG. 1A, the substrate 100 of the first embodiment is a printed circuit board in which a plurality of wiring layers are formed in an insulating film, and includes an insulating film 10, the wiring layers 11 and 12, and vias 13a through 13d, 14, and 15. The insulating film 10 is formed of, for example, a resin material such as epoxy or polyimide or a ceramic material such as aluminum oxide. The wiring layers 11 and 12 and the vias 13a through 13d, 14, and 15 are formed of metal such as, for example, gold or copper.

A first end part of the wiring layer 11 is electrically connected through the via 14 to a power supply unit 1 located on the substrate 100. The power supply unit 1 is, for example, a DC-DC converter, but may be other than the DC-DC converter. A first end part of the wiring layer 12 is electrically connected through the via 15 to an electronic component 2 located on the substrate 100. The electronic component 2 is, for example, a semiconductor component such as a Large Scale Integration (LSI), but may be other than the semiconductor component.

A second end part of the wiring layer 11 and a second end part of the wiring layer 12 overlap with each other across the insulating film 10 in the stacking direction of the wiring layers 11 and 12. That is, the part within a predetermined distance from an end 16 of the second end part of the wiring layer 11 and the part within a predetermined distance from an end 17 of the second end part of the wiring layer 12 overlap with each other across the insulating film 10 in the stacking direction of the wiring layers 11 and 12 to form an overlap region 18. The wiring layers 11 and 12 extend from the overlap region 18 in opposite directions.

The vias 13a through 13d penetrate through the insulating film 10 between the wiring layers 11 and 12 in the overlap region 18. The vias 13a through 13d are arranged in a straight line from the end 16 of the wiring layer 11 along the wiring direction of the wiring layer 11, and are arranged in a straight line from the end 17 of the wiring layer 12 along the wiring direction of the wiring layer 12. The wiring layer 11 is connected to the power supply unit 1. Thus, current flows from the wiring layer 11 to the wiring layer 12 through the vias 13a through 13d to be supplied to the electronic component 2 connected to the wiring layer 12. Among the vias 13a through 13d, the via 13a is located most upstream in the flow direction of current, and the vias 13b, 13c, and 13d are located in this order from the upstream to the downstream side in the flow direction of current.

As illustrated in FIG. 1B, the parts connecting to the wiring layer 11 of the vias 13a through 13d are respectively defined as connection parts 21a through 21d. The part connecting to the wiring layer 11 of the via 14 is defined as a connection part 25. The wiring layer 11 includes a wiring layer body 22 and conductive portions 23. The conductive portions 23 are formed by providing apertures 24 in the wiring layer body 22 around the connection parts 21a and 21d. The aperture 24 penetrates through, for example, the wiring layer body 22. Thus, the connection parts 21a and 21d are coupled to the wiring layer body 22 through the conductive portions 23. On the other hand, no aperture 24 is provided around the connection parts 21b and 21c. Thus, the entire peripheral surfaces of the connection parts 21b and 21c are directly connected to the wiring layer body 22.

As illustrated in FIG. 1C, the parts connecting to the wiring layer 12 of the vias 13a through 13d are respectively defined as connection parts 26a through 26d. The wiring layer 12 includes a wiring layer body 27 and conductive portions 28. The conductive portions 28 are formed by providing apertures 29 in the wiring layer body 27 around the connection parts 26a and 26d. The aperture 29 penetrates through, for example, the wiring layer body 27. Therefore, the connection parts 26a and 26d are coupled to the wiring layer body 27 through the conductive portions 28. On the other hand, no aperture 29 is provided around the connection parts 26b and 26c. Thus, the entire peripheral surfaces of the connection parts 26b and 26c are directly connected to the wiring layer body 27.

Figure 2A:
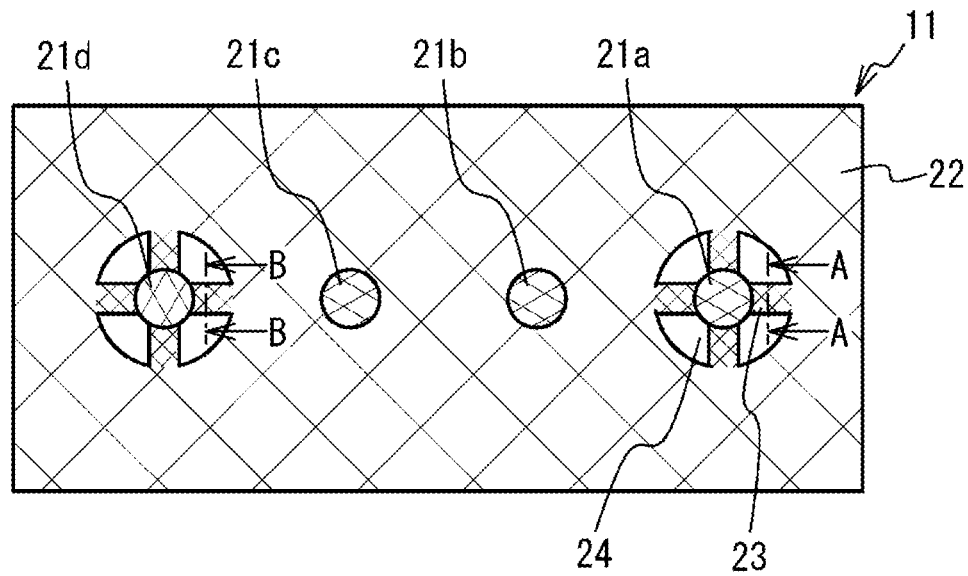
FIG. 2A is an enlarged plan view of a part of the wiring layer.
Figure 2B:
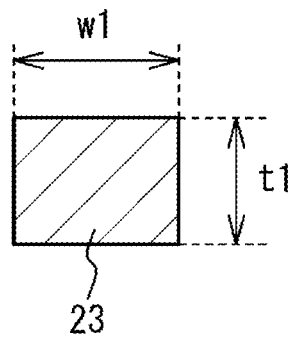
FIG. 2B is a cross-sectional view taken along line A-A and line B-B in FIG. 2A.
Figure 2C:
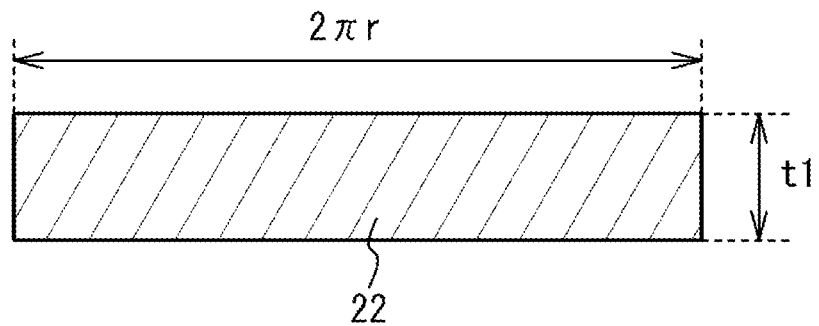
FIG. 2C is a development view of a part being in contact with a connection part of a wiring layer body.

FIG. 2A is an enlarged plan view of a part of the wiring layer 11, FIG. 2B is a cross-sectional view taken along line A-A and line B-B in FIG. 2A, and FIG. 2C is a development view of the parts being in contact with the connection parts 21b and 21c of the wiring layer body 22. Here, the radii of the connection parts 21a through 21d are represented by r.

The thickness of the wiring layer 11, i.e., the thickness of the wiring layer body 22 and the thickness of the conductive portion 23, is represented by t1. The width of the conductive portion 23 is represented by w1. In this case, as illustrated in FIG. 2A through FIG. 2C, the cross-sectional area of the conductive portion 23 is w1×t1. The area of the part being in contact with the connection part 21b of the wiring layer body 22 and the area of the part being in contact with the connection part 21c of the wiring layer body 22 are both 2πr×t1. Since the width w1 of the conductive portion 23 is less than the outer perimeter 2πr of each of the connection parts 21a through 21d, the cross-sectional area of the conductive portion 23 is less than the area of the part being in contact with the connection part 21b of the wiring layer body 22 and the area of the part being in contact with the connection part 21c of the wiring layer body 22. The connection parts 21a and 21d are not completely surrounded by the four conductive portions 23 located around the connection parts 21a and 21d, and a part of each of the connection parts 21a and 21d is in contact with the aperture 24. Thus, the electrical resistance between the wiring layer 11 and each of the vias 13a and 13d is greater than the electrical resistance between the wiring layer 11 and each of the vias 13b and 13c.

Figure 3A:
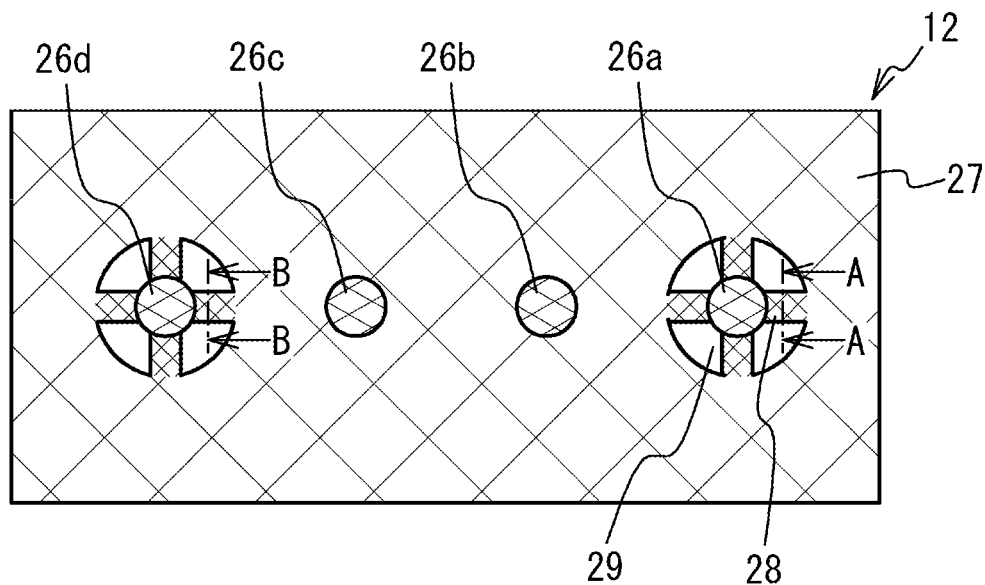
FIG. 3A is an enlarged plan view of a part of the wiring layer.
Figure 3B:
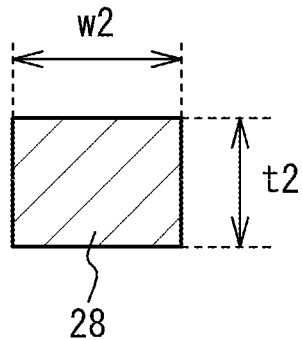
FIG. 3B is a cross-sectional view taken along line A-A and line B-B in FIG. 3A.
Figure 3C:
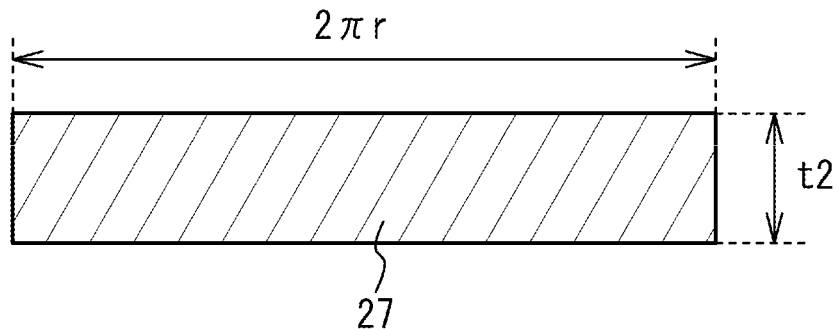
FIG. 3C is a development view of the part being in contact with the connection part of the wiring layer body.

FIG. 3A is an enlarged plan view of a part of the wiring layer 12, FIG. 3B is a cross-sectional view taken along line A-A and line B-B in FIG. 3A, and FIG. 3C is a development view of the parts being in contact with the connection parts 26b and 26c of the wiring layer body 27. Here, the radii of the connection parts 26a through 26d are represented by r. The thickness of the wiring layer 12, i.e., the thickness of the wiring layer body 27 and the thickness of the conductive portion 28, is represented by t2. The width of the conductive portion 28 is represented by w2. In this case, as illustrated in FIG. 3A through FIG. 3C, the cross-sectional area of the conductive portion 28 is w2×t2. The area of the part being in contact with the connection part 26b of the wiring layer body 27 and the area of the part being in contact with the connection part 26c of the wiring layer body 27 are both 2πr×t2. Since the width w2 of the conductive portion 28 is less than the outer perimeter 2πr of each of the connection parts 26a through 26d, the cross-sectional area of the conductive portion 28 is less than the area of the part being in contact with the connection part 26b of the wiring layer body 27 and the area of the part being in contact with the connection part 26c of the wiring layer body 27. Each of the connection parts 26a and 26d is not completely surrounded by the four conductive portions 28 located around each of the connection parts 26a and 26d, and a part of each of the connection parts 26a and 26d is in contact with the aperture 29. Thus, the electrical resistance between the wiring layer 12 and each of the vias 13a and 13d is greater than the electrical resistance between the wiring layer 12 and each of the vias 13b and 13c.

Figure 4A:
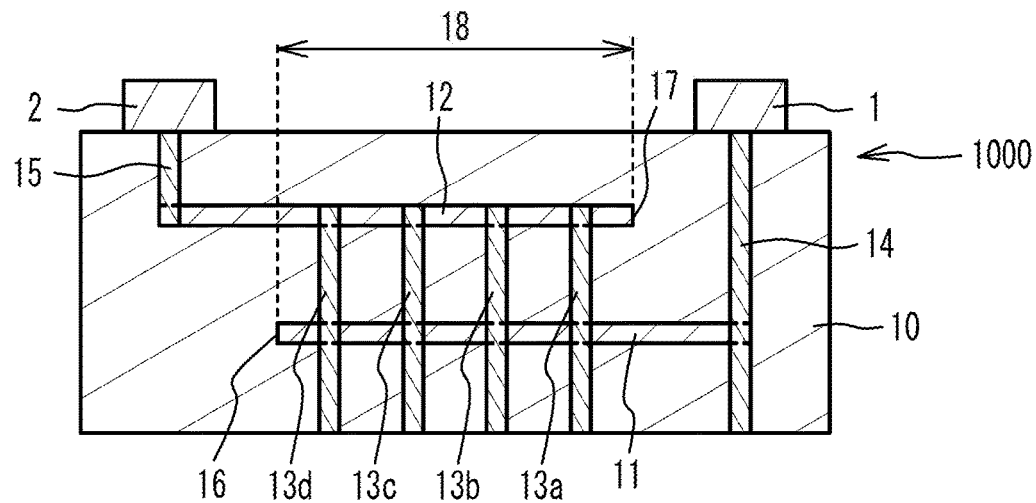
FIG. 4A is a cross-sectional view of a substrate in accordance with a first comparative example.
Figure 4B:
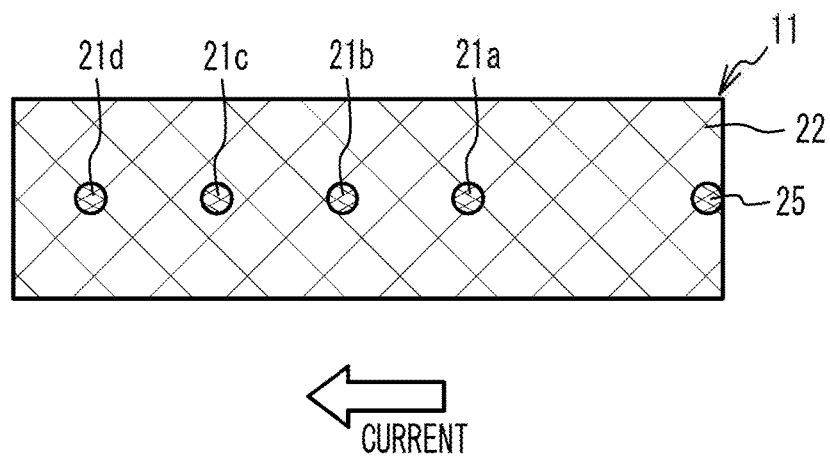
FIG. 4B and FIG. 4C are plan views of wiring layers.
Figure 4C:
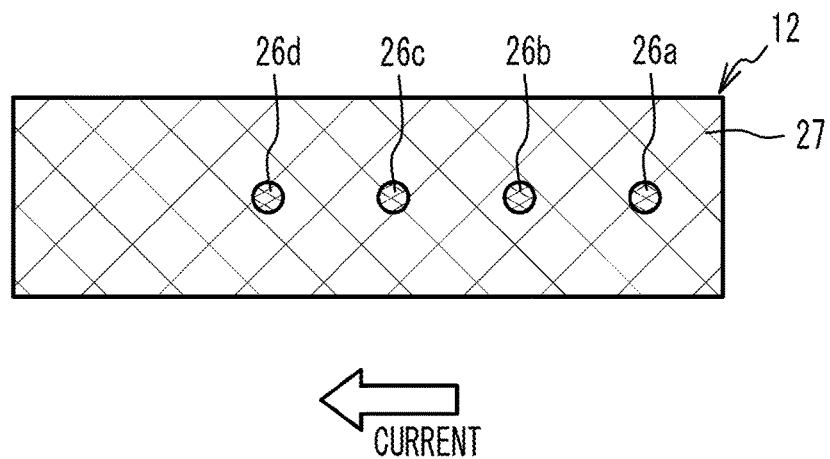

Here, before the advantage of the substrate of the first embodiment is described, substrates of comparative examples will be described. FIG. 4A is a cross-sectional view of a substrate 1000 in accordance with a first comparative example, FIG. 4B is a plan view of the wiring layer 11, and FIG. 4C is a plan view of the wiring layer 12. As illustrated in FIG. 4A through FIG. 4C, in the substrate 1000 of the first comparative example, no aperture 24 is provided around the connection parts 21a and 21d in the wiring layer 11. Thus, the entire peripheral surfaces of the connection parts 21a through 21d are directly connected to the wiring layer body 22. In the same manner, no aperture 29 is provided around the connection parts 26a and 26d in the wiring layer 12. Thus, the entire peripheral surfaces of the connection parts 26a through 26d are directly connected to the wiring layer body 27. Other structures are the same as those of the first embodiment, and the description thereof is thus omitted.

Figure 5:
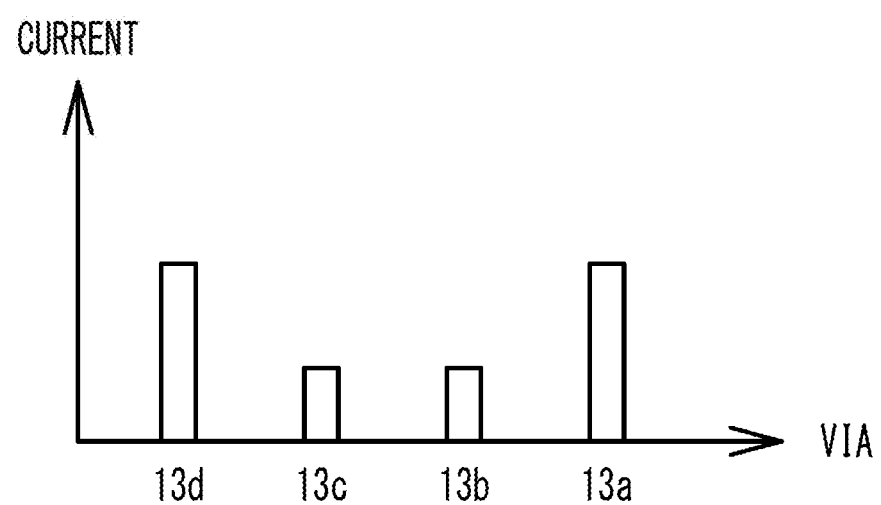
FIG. 5 is a diagram for describing the current flowing through a via of the substrate in accordance with the first comparative example.

FIG. 5 is a diagram for describing the current flowing through the vias 13a through 13d of the substrate 1000 in accordance with the first comparative example. As illustrated in FIG. 5, in the substrate 1000 of the first comparative example, the current crowds into the vias 13a and 13d at both ends among the vias 13a through 13d. A reason why the current crowds into the vias 13a and 13d at both ends is considered as follows.

That is, as illustrated in FIG. 4A, when the wiring layer 12 is coupled through the vias 13a through 13d to the wiring layer 11 through which current from the power supply unit 1 flows, the wiring layer 12 is added as a pathway through which the current flows. To flow the current through the wiring layer 12, the current crowds into the via 13a located most upstream in the flow direction of current in the wiring layer 11. In the via 13d located most downstream in the flow direction of current in the wiring layer 11, since the wiring layer 11 ends, the pathway through which the current flows is reduced, causing the current to crowd into the via 13d. In a different perspective, the via 13a is a changing point at which the current pathway changes from one pathway, which is the wiring layer 11, to two pathways, which are the wiring layers 11 and 12 connected in parallel. The via 13d is a changing point at which the current pathway changes from two pathways, which are the wiring layers 11 and 12 connected in parallel, to one pathway, which is the wiring layer 12. At such changing points, the resistance of the current pathway greatly changes. Accordingly, the current crowds into the vias 13a and 13d. When the current crowds into the vias 13a and 13d, the current densities of the vias 13a and 13d increase, and a break due to electromigration may be thereby caused.

Figure 6A:
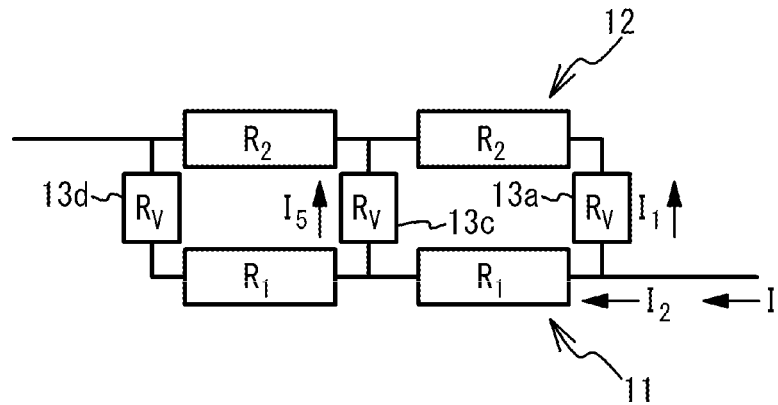
FIG. 6A through FIG. 6C are circuit diagrams for describing a reason why current crowds into the vias at both ends of the substrate in accordance with the first comparative example.
Figure 6B:
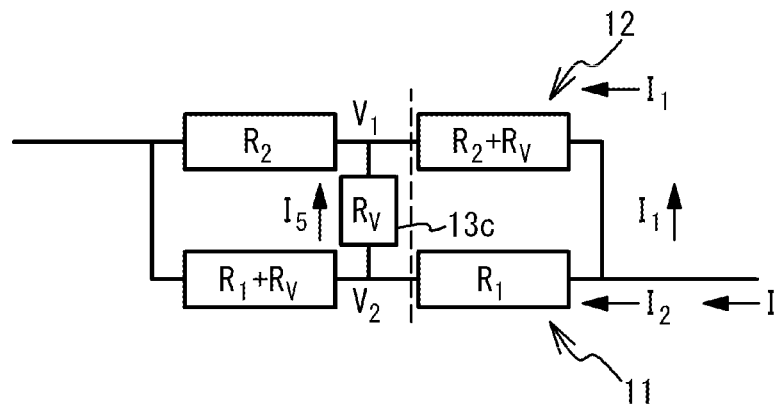
Figure 6C:
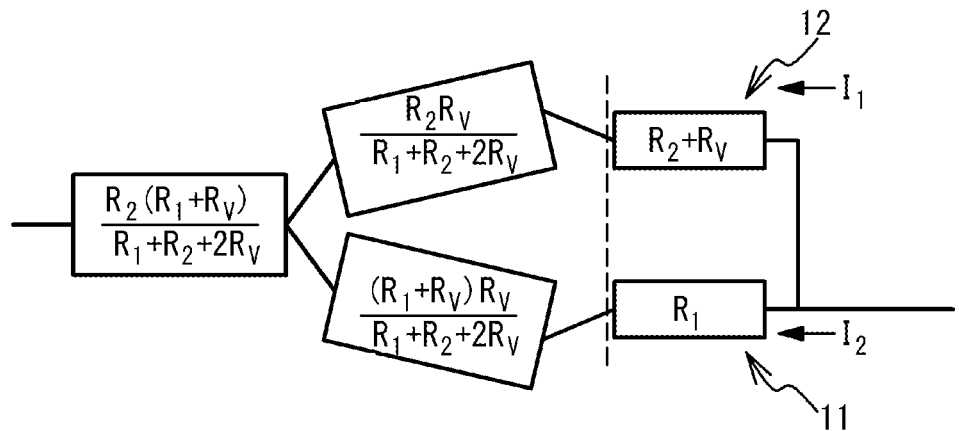

FIG. 6A through FIG. 6C are circuit diagrams for describing a reason why the current crowds into the vias 13a and 13d at both ends of the substrate 1000 in accordance with the first comparative example. In FIG. 6A through FIG. 6C, for the sake of shorthand, it is assumed that the wiring layer 11 and the wiring layer 12 are connected by three vias 13a, 13c, and 13d. As illustrated in FIG. 6A, it is assumed that the electrical resistance of the wiring layer 11 is $R_1$, the electrical resistance of the wiring layer 12 is $R_2$, and the electrical resistance of each of the vias 13a, 13c, and 13d is $R_V$. It is assumed that the current I flowing through the wiring layer 11 diverges into the current $I_1$ and the current $I_2$ at the connecting point of the via 13a. The current flowing through the via 13c is represented by $I_5$. As illustrated in FIG. 6B, when the electrical resistance $R_1$ of the wiring layer 11 and the electrical resistance $R_V$ of the via 13d are combined, and the electrical resistance $R_2$ of the wiring layer 12 and the electrical resistance $R_V$ of the via 13a are combined, a bridge circuit is formed. When the part on the left side of the dashed line in FIG. 6B is rewritten, the circuit diagram becomes as illustrated in FIG. 6C.

In this case, the current $I_1$ and the current $I_2$ are expressed by $$I_1 = \frac{R_1 + \frac{(R_v + R_1)R_v}{(R_1 + R_2 + 2R_v)}}{(R_1 + R_2 + R_v) + \frac{(R_1 + R_2 + R_v)R_v}{(R_1 + R_2 + 2R_v)}} I, \tag{1}$$

$$I_2 = \frac{R_2 + R_v + \frac{R_2 R_v}{(R_1 + R_2 + 2R_v)}}{(R_1 + R_2 + R_v) + \frac{(R_1 + R_2 + R_v)R_v}{(R_1 + R_2 + 2R_v)}} I. \quad (2)$$

The voltages $V_1$ and $V_2$ at both ends of the via 13c are expressed by $$V_1 = (R_2 + R_v)I_1, \quad (3)$$

$$V_2 = R_1 I_2. \quad (4)$$

Thus, the current $I_5$ flowing through the via 13c is expressed by $$I_5 = (V_1 - V_2)/R_v = \frac{1}{\frac{R_1 + R_2}{R_v} + 3} I. \quad (5)$$

Here, since a plurality of vias are connected in parallel, the electrical resistance $R_v$ of each of the vias 13a, 13c, and 13d is assumed to be sufficiently small compared to the respective electrical resistances $R_1$ and $R_2$ of the wiring layers 11 and 12. In this case, the current $I_1$, $I_2$, and $I_5$ are expressed by $$I_1 = \frac{R_1}{R_1 + R_2} I, \quad (6)$$

$$I_2 = \frac{R_2}{R_1 + R_2} I, \quad (7)$$

$$I_5 = \frac{1}{\frac{R_1 + R_2}{R_v} + 3} I \cong \frac{R_v}{R_1 + R_2} I \ll I. \quad (8)$$

As clear from the expressions (6) through (8), the current $I_1$ and the current $I_2$ are determined by the ratio between the electrical resistance $R_1$ and the electrical resistance $R_2$, while the current $I_5$ is determined by the ratios between the electrical resistance $R_v$ and the electrical resistances $R_1$ and $R_2$. As described above, since the electrical resistance $R_v$ is sufficiently small compared to the electrical resistances $R_1$ and $R_2$, the current $I_5$ flowing through the via 13c is less than the current $I_1$ flowing through the via 13a. The same applies to the via 13d, and the current $I_5$ flowing through the via 13c is less than the current flowing through the via 13d. Thus, it is considered that the current crowds into the via 13a, which is located most upstream in the flow direction of the current flowing through the wiring layer 11, and the via 13d, which is located most downstream.

Figure 7A:
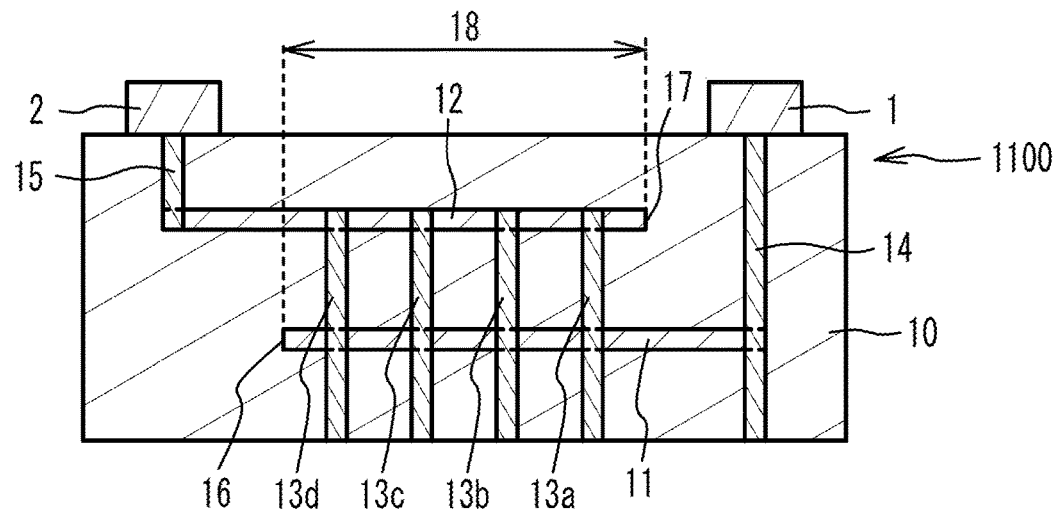
FIG. 7A is a cross-sectional view of a substrate in accordance with a second comparative example.
Figure 7B:
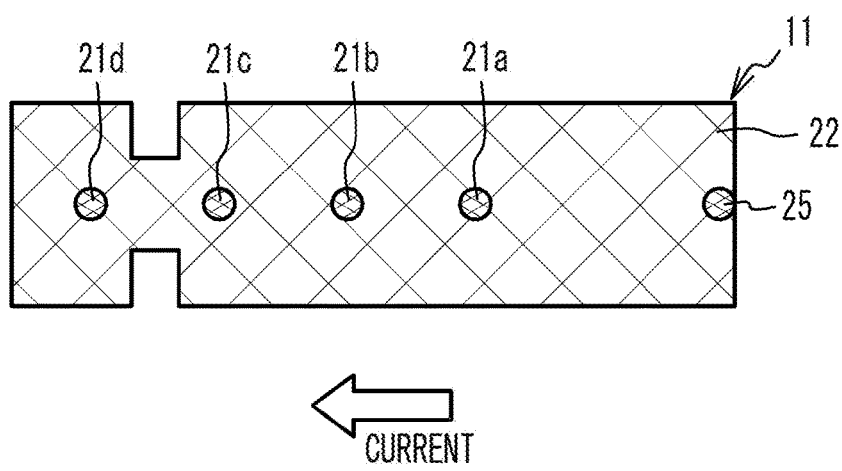
FIG. 7B and FIG. 7C are plan views of wiring layers.
Figure 7C:
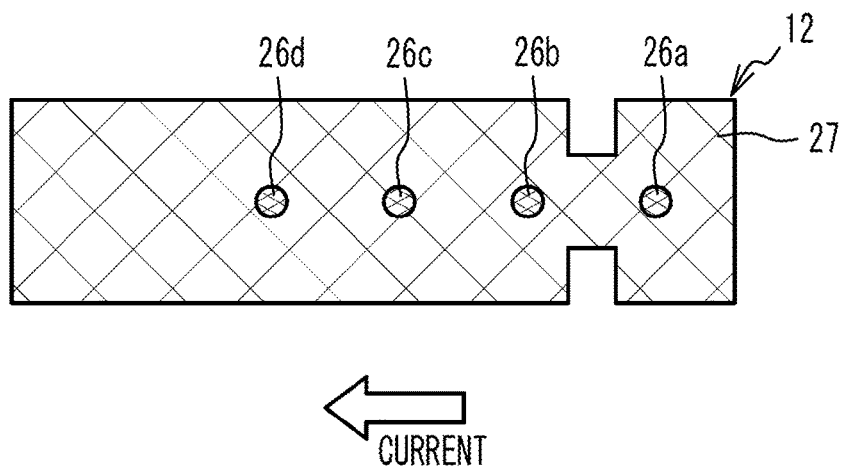

FIG. 7A is a cross-sectional view of a substrate 1100 in accordance with a second comparative example, FIG. 7B is a plan view of the wiring layer 11, and FIG. 7C is a plan view of the wiring layer 12. As illustrated in FIG. 7A through FIG. 7C, in the substrate 1100 of the second comparative example, no aperture 24 is provided around the connection parts 21a and 21d in the wiring layer 11 and no aperture 29 is provided around the connection parts 26a and 26d in the wiring layer 12. Instead, in the wiring layer 11, the width of the wiring layer body 22 in the region between the connection part 21c and the connection part 21d is less than the width of the wiring layer body 22 in the remaining region. In the wiring layer 12, the width of the wiring layer body 27 in the region between the connection part 26a and the connection part 26b is less than the width of the wiring layer body 27 in the remaining region. Other structures are the same as those of the first embodiment, and the description thereof is thus omitted.

In the second comparative example, the width of the wiring layer body 22 between the connection part 21c and the connection part 21d is reduced, and the width of the wiring layer body 27 between the connection part 26a and the connection part 26b is reduced. This structure inhibits the current from crowding into the vias 13a and 13d. However, since the widths of the wiring layer bodies 22 and 27 are reduced, a problem of a voltage drop may arise.

Even when the wiring layer is thickened, the diameter of a via other than the vias at both ends among a plurality of vias connecting between the wiring layers is increased, or the number of vias connecting the wiring layers is increased, it is difficult to inhibit current from crowding into the vias at both ends.

Figure 8:
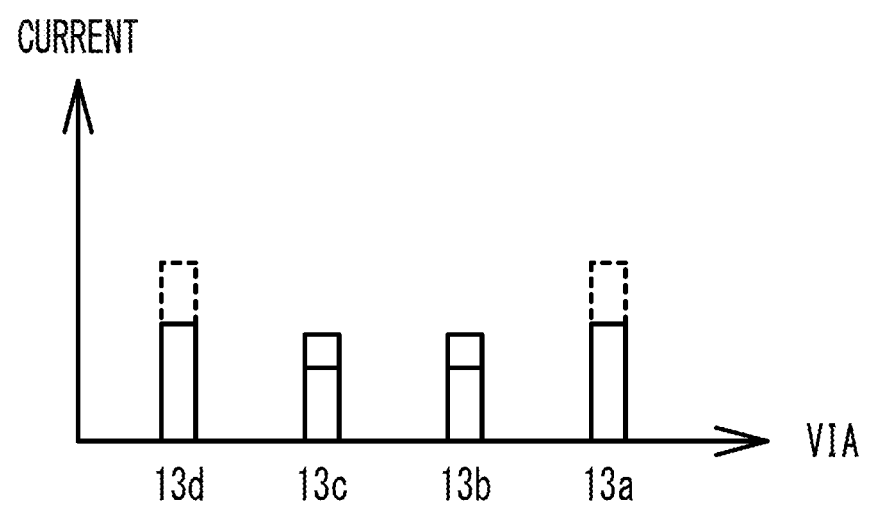
FIG. 8 is a diagram for describing the current flowing through the substrate in accordance with the first embodiment.

FIG. 8 is a diagram for describing the current flowing through the vias 13a through 13d of the substrate 100 in accordance with the first embodiment. As illustrated in FIG. 8, in the substrate 100 of the first embodiment, the current evenly flows through the vias 13a through 13d, and the current is inhibited from crowding into the vias 13a and 13d at both ends. The reason is considered as follows.

That is, as illustrated in FIG. 1B, the connection parts 21a and 21d located at both ends among the connection parts 21a through 21d are coupled to the wiring layer body 22 through the conductive portions 23, and the entire peripheral surfaces of the connection parts 21b and 21c located at other than both ends are directly connected to the wiring layer body 22. As illustrated in FIG. 2A through FIG. 2C, the cross-sectional area of the conductive portion 23 is less than the area of the part being in contact with the connection part 21b of the wiring layer body 22 and the area of the part being in contact with the connection part 21c of the wiring layer body 22. Accordingly, the electrical resistance between the wiring layer 11 and each of the vias 13a and 13d is increased, and thereby, it becomes difficult for the current to flow into the vias 13a and 13d. Thus, the current flowing through the vias 13a and 13d reduces, and the current flowing through the vias 13b and 13c increases. Therefore, the current is inhibited from crowding into the vias 13a and 13d, and the current evenly flows through the vias 13a through 13d.

In addition, as illustrated in FIG. 1C, the connection parts 26a and 26d located at both ends among the connection parts 26a through 26d are coupled to the wiring layer body 27 through the conductive portions 28, and the entire peripheral surfaces of the connection parts 26b and 26c located at other than both ends are directly connected to the wiring layer body 27. As illustrated in FIG. 3A through FIG. 3C, the cross-sectional area of the conductive portion 28 is less than the area of the part being in contact with the connection part 26b of the wiring layer body 27 and the area of the part being in contact with the connection part 26c of the wiring layer body 27. Accordingly, the electrical resistance between the wiring layer 12 and each of the vias 13a and 13d is increased, and it becomes more difficult for current to flow into the vias 13a and 13d. Thus, the current is further inhibited from crowding into the vias 13a and 13d.

Figure 9A:
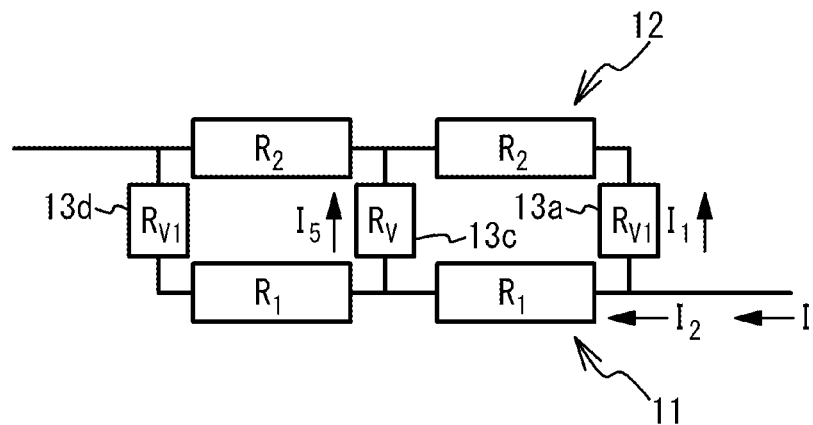
FIG. 9A through FIG. 9C are circuit diagrams for describing a reason why the current is inhibited from crowding into the vias at both ends of the substrate in accordance with the first embodiment.
Figure 9B:
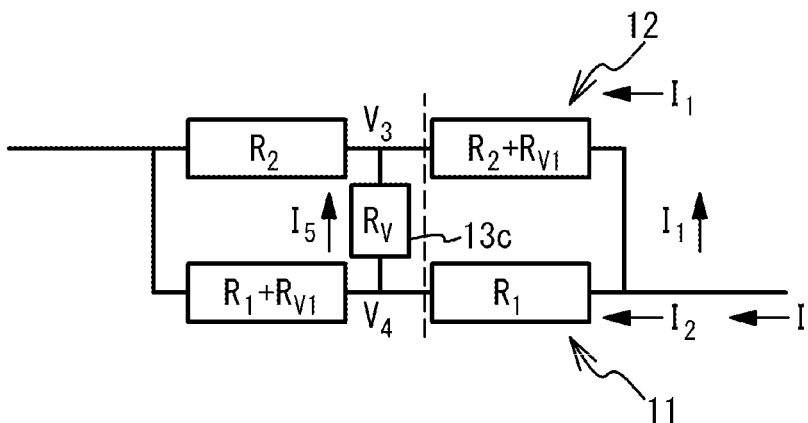
Figure 9C:
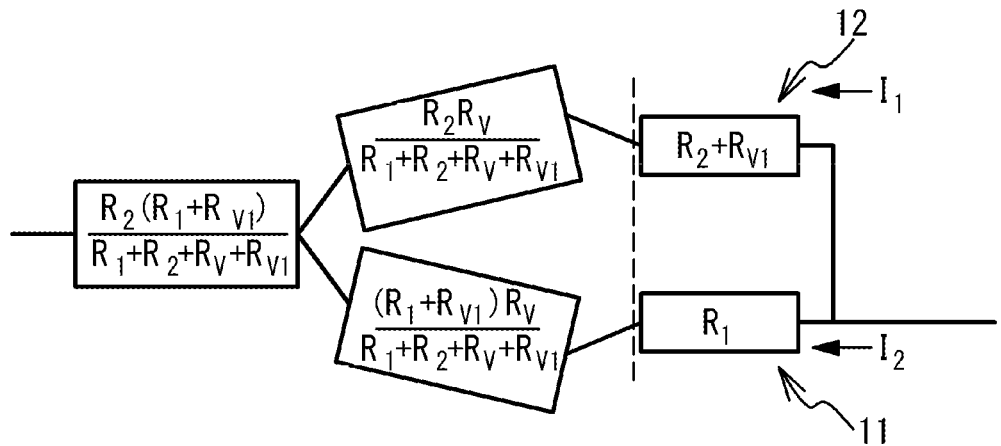

FIG. 9A through FIG. 9C are circuit diagrams for describing a reason why the current is inhibited from crowding into the vias 13a and 13d at both ends of the substrate 100 in accordance with the first embodiment. In FIG. 9A through FIG. 9C, for the sake of shorthand, it is assumed that the wiring layer 11 and the wiring layer 12 are connected by three vias 13a, 13c, and 13d. As illustrated in FIG. 9A, it is assumed that the electrical resistance of the wiring layer 11 is $R_1$, the electrical resistance of the wiring layer 12 is $R_2$, the electrical resistance of the via 13c is $R_V$, and the electrical resistance of each of the vias 13a and 13d is $R_{V1}$ greater than $R_V$ ($R_{V1}=R_V+R_C$). $R_C$ is an increase in resistance between the wiring layer 11 and each of the vias 13a and 13d due to connecting of each of the connection parts 21a and 21d to the wiring layer body 22 through the conductive portions 23. It is assumed that the current I flowing through the wiring layer 11 diverges into the current $I_1$ and the current $I_2$ at the connection point of the via 13a. The current flowing through the via 13c is represented by $I_5$. As illustrated in FIG. 9B, when the electrical resistance $R_1$ of the wiring layer 11 and the electrical resistance $R_{V1}$ of the via 13d are combined, and the electrical resistance $R_2$ of the wiring layer 12 and the electrical resistance $R_{V1}$ of the via 13a are combined, a bridge circuit is formed. When the part on the left side of the dashed line in FIG. 9B is rewritten, the circuit diagram becomes as illustrated in FIG. 9C.

In this case, the current $I_1$ and the current $I_5$ are expressed by $$I_1 = \frac{R_1 + \frac{(R_{v1}+R_1)R_v}{(R_1+R_2+R_v+R_{v1})}}{(R_1+R_2+R_{v1})+\frac{(R_1+R_2+R_{v1})R_v}{(R_1+R_2+R_v+R_{v1})}} I, \quad (9)$$

$$I_5 = \frac{1}{R_v} \frac{\left\{R_1 + \frac{(R_{v1}+R_1)R_v}{(R_1+R_2+R_v+R_{v1})}\right\}(R_2+R_{v1}) - \left\{R_2+R_{v1}+\frac{R_2 R_v}{(R_1+R_2+R_v+R_{v1})}\right\}R_1}{(R_1+R_2+R_{v1})+\frac{(R_1+R_2+R_{v1})R_v}{(R_1+R_2+R_v+R_{v1})}} I. \quad (10)$$

Here, when considering a case where the current is inhibited from crowding into the vias 13a and 13d and $I_1=I_5$ is established, the electrical resistance $R_{V1}$ of each of the vias 13a and 13d is expressed by $$R_{v1}=\sqrt{R_1(R_1+R_2+2R_v)}. \quad (11)$$

Thus, to satisfy the equation (11), the cross-sectional area of the conductive portion 23 connecting each of the connection parts 21a and 21b and the wiring layer body 22 is adjusted. This adjustment inhibits the current from crowding into the vias 13a and 13d, and allows the current to evenly flow into a plurality of vias.

In the first embodiment, as illustrated in FIG. 1B, the connection parts 21a and 21d located closer to both ends of the wiring layer 11 among the connection parts 21a through 21d are coupled to the wiring layer body 22 through the conductive portions 23. As illustrated in FIG. 2A through FIG. 2C, in the wiring layer 11, the cross-sectional area of the conductive portion 23 (w1×t1) is less than the area of the part being in contact with the connection part 21b, which is located at other than both ends, of the wiring layer 11 (2πr×t1) and the area of the part being in contact with the connection part 21c, which is located at other than both ends, of the wiring layer 11 (2πr×t1). Thus, as described with FIG. 8 and FIG. 9, the current is inhibited from crowding into the vias 13a and 13d. Thus, the emergence of the via into which the current crowds is inhibited. In addition, since the width of the wiring layer 11 is reduced in the second comparative example, the voltage drop may increase. In contrast, since the width of the wiring layer 11 is not reduced in the first embodiment, increase in voltage drop is also inhibited.

In addition, as illustrated in FIG. 1B, in the wiring layer 11, each of the connection parts 21a and 21d at both ends is connected to the wiring layer body 22 through a plurality of the conductive portions 23. In this case, it is sufficient if the sum of the cross-sectional areas of the conductive portions 23 in each of the connection parts 21a and 21d is less than the area of the part being in contact with the connection part 21b of the wiring layer 11 and the area of the part being in contact with the connection part 21c of the wiring layer 11. Each of the connection parts 21a and 21d at both ends may be coupled to the wiring layer body 22 through one conductive portion 23.

As illustrated in FIG. 1C, the connection parts 26a and 26d located closer to both ends of the wiring layer 12 among the connection parts 26a through 26d are coupled to the wiring layer body 27 through the conductive portions 28. As illustrated in FIG. 3A through FIG. 3C, in the wiring layer 12, the cross-sectional area of the conductive portion 28 (w2×t2) is less than the area of the part being in contact with the connection part 26b, which is located at other than both ends, of the wiring layer 12 (2πr×t2) and the area of the part being in contact with the connection part 26c, which is located at other than both ends, of the wiring layer 12 (2πr×t2). This configuration further inhibits the current from crowding into the vias 13a and 13d as described in FIG. 8.

In addition, as illustrated in FIG. 1C, in the wiring layer 12, the connection parts 26a and 26d at both ends are coupled to the wiring layer body 27 through a plurality of the conductive portions 28. In this case, it is sufficient if the sum of the cross-sectional areas of the conductive portions 28 in each of the connection parts 26a and 26d is less than the area of the part being in contact with the connection part 26b of the wiring layer 12 and the area of the part being in contact with the connection part 26c of the wiring layer 12. The connection parts 26a and 26d at both ends may be coupled to the wiring layer body 27 through one conductive portion 28.

As illustrated in FIG. 1B, the conductive portions 23 are formed by providing the apertures 24 around the connection parts 21a and 21d. This structure makes it possible to easily obtain the wiring layer 11 having a structure in which the cross-sectional area of the conductive portion 23 connecting to each of the connection parts 21a and 21d at both ends is less than the area of the part being in contact with the connection part 21b, which is located at other than both ends, of the wiring layer 11 and the area of the part being in contact with the connection part 21c, which is located at other than both ends, of the wiring layer 11. In the same manner, as illustrated in FIG. 1C, the conductive portions 28 are formed by providing the apertures 29 around the connection parts 26a and 26d. This structure makes it possible to easily obtain the wiring layer 12 having a structure in which the cross-sectional area of the conductive portion 28 connected to each of the connection parts 26a and 26d at both ends is less than the area of the part being in contact with the connection part 26b, which is located at other than both ends, of the wiring layer 12 and the area of the part being in contact with the connection part 26c, which is located at other than both ends, of the wiring layer 12.

As illustrated in FIG. 1A, the wiring layer 11 is coupled to the power supply unit 1 through the via 14. That is, the wiring layers 11 and 12 are power supply layers to which current is to be supplied from the power supply unit 1. When the wiring layers 11 and 12 are power supply layers, large current flows through the wiring layers 11 and 12. Thus, when the current crowds into the vias 13a and 13d at both ends, a break is likely to occur. Thus, when the wiring layer 11 is a power supply layer, the connection parts 21a and 21d are preferably coupled to the wiring layer body 22 through the conductive portion 23. The wiring layers 11 and 12 may be ground layers to which a ground potential is given from the electronic component 2 and through which current flows toward a ground.

The first embodiment has described, as an example, a case where both the connection parts 21a and 21d at both ends are coupled to the wiring layer body 22 through the conductive portions 23 as illustrated in FIG. 1B. However, at least one of the connection parts 21a and 21d may be coupled to the wiring layer body 22 through the conductive portion 23. This structure inhibits the current from crowding into at least one of the vias 13a and 13d. In the same manner, a case where both the connection parts 26a and 26d at both ends are coupled to the wiring layer body 27 through the conductive portions 28 as illustrated in FIG. 1C has been described as an example, but at least one of the connection parts 26a and 26d may be coupled to the wiring layer body 27 through the conductive portion 28. This structure further inhibits the current from crowding into at least one of the vias 13a and 13d.

Second Embodiment

Figure 10A:
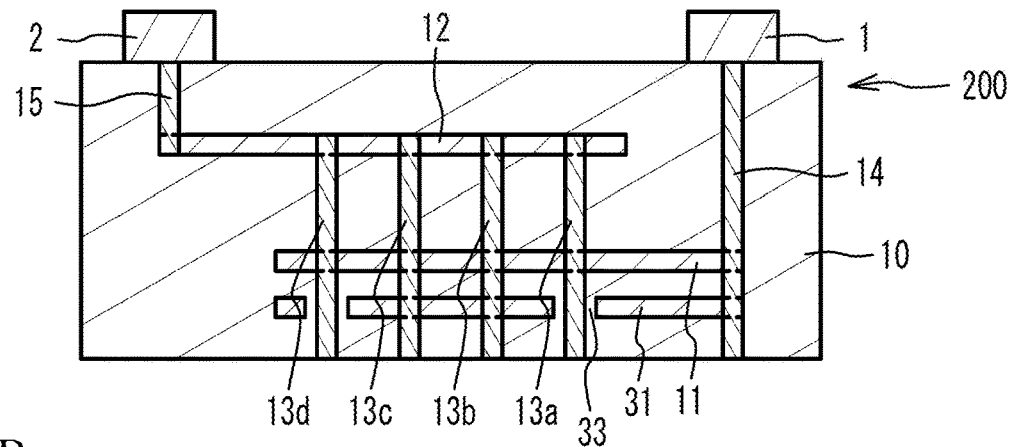
FIG. 10A is a cross-sectional view of a substrate in accordance with a second embodiment.
Figure 10B:
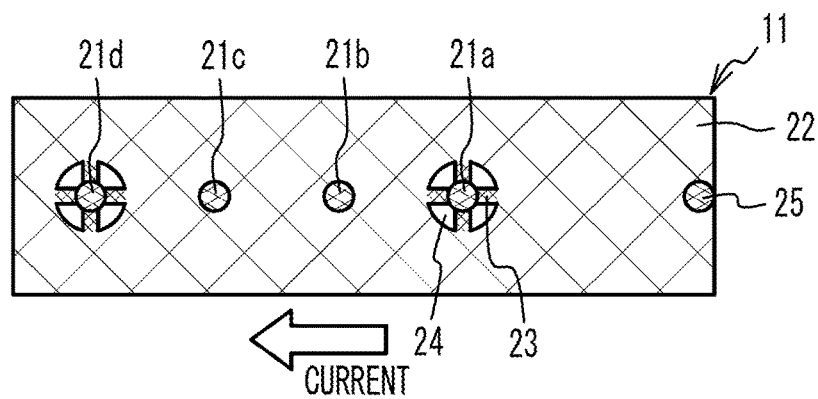
FIG. 10B through FIG. 10D are plan views of wiring layers.
Figure 10C:
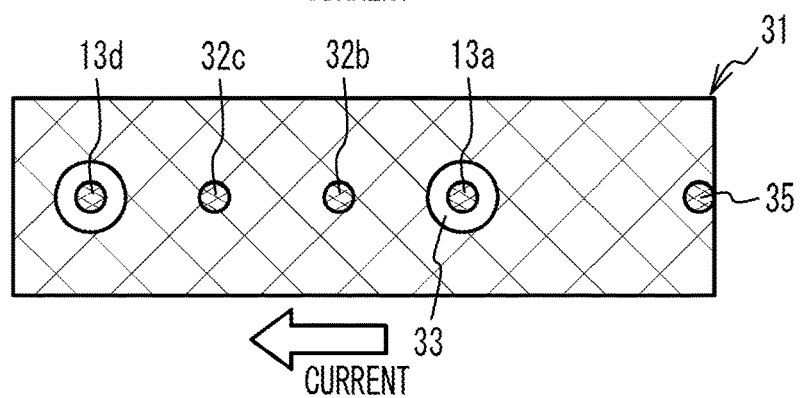
Figure 10D:
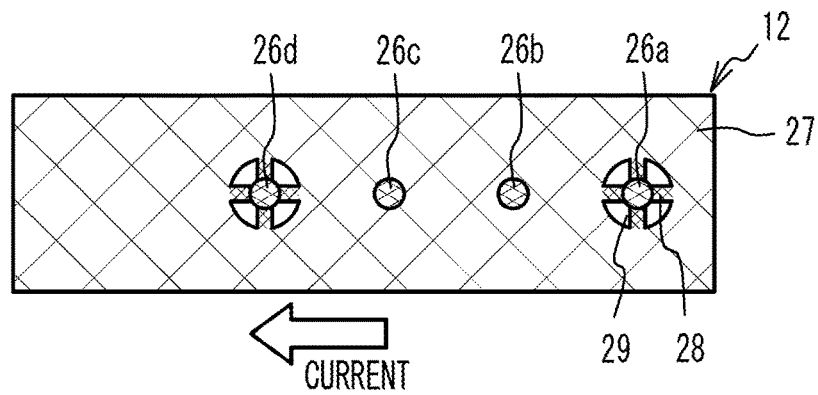

FIG. 10A is a cross-sectional view of a substrate 200 in accordance with a second embodiment, FIG. 10B is a plan view of the wiring layer 11, FIG. 10C is a plan view of a wiring layer 31, and FIG. 10D is a plan view of the wiring layer 12. As illustrated in FIG. 10A through FIG. 10D, in the substrate 200 of the second embodiment, in addition to the wiring layers 11 and 12, the wiring layer 31 is provided in the insulating film 10. The wiring layer 31 extends from the via 14 beyond the via 13d. The wiring layer 31 has insertion holes 33 through which the vias 13a and 13d pass without connecting to the wiring layer 31. No aperture is located around connection parts 32b and 32c respectively connecting to the wiring layer 31 of the vias 13b and 13c, and the entire peripheral surfaces of the connection parts 32b and 32c are connected to the wiring layer 31. The part connecting to the wiring layer 31 of the via 14 is defined as a connection part 35. Other structures are the same as those of the first embodiment, and the description thereof is thus omitted.

The second embodiment provides the wiring layer 31 that is connected to the vias 13b and 13c of the vias 13a through 13d and has the insertion holes 33 through which the vias 13a and 13d at both ends pass without connecting to the wiring layer 31. This structure increases the current flowing through the vias 13b through 13c through which current is unlikely to flow. Since the total amount of the current flowing through the vias 13a through 13d remains the same, the increase in current flowing through the vias 13b and 13c effectively decreases the current flowing through the vias 13a and 13d into which the current tends to crowd.

In addition, as illustrated in FIG. 10A, the wiring layer 31 is coupled to the power supply unit 1 through the via 14. As described above, when the wiring layer 11 is a power supply layer and the current crowds into the vias 13a and 13d at both ends, a break easily occurs. However, since the current flowing through the vias 13a and 13d is effectively reduced by providing the wiring layer 31, a break in the vias 13a and 13d is effectively inhibited even when the wiring layer 11 is a power supply layer.

Figure 11:
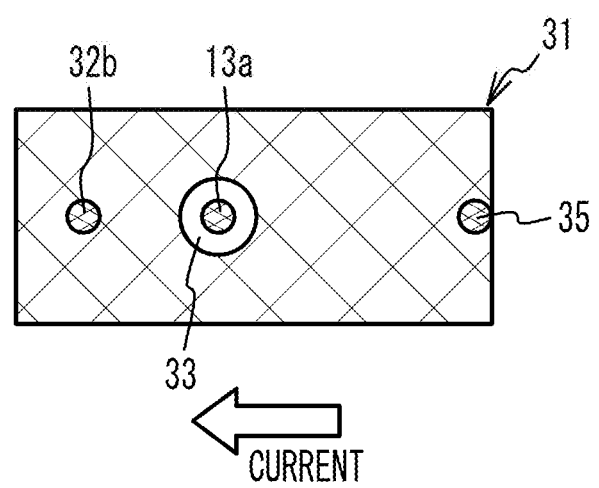
FIG. 11 is a plan view of another example of the wiring layer.

A case where the wiring layer 31 is connected to both the vias 13b and 13c located at other than both ends has been described as an example, but it is sufficient if the wiring layer 31 is connected to at least one of the vias 13b and 13c. In addition, a case where the wiring layer 31 has two insertion holes 33 through which both the vias 13a and 13d at both ends pass without connecting to the wiring layer 31 has been described as an example, but it is sufficient if the wiring layer 31 has the insertion hole 33 through which at least one of the vias 13a and 13d passes without connecting to the wiring layer 31. FIG. 11 is a plan view of another example of the wiring layer 31. As illustrated in FIG. 11, the wiring layer 31 may extend from the via 14 to the part between the vias 13b and 13c, connect to the via 13b at the connection part 32b, and have the insertion hole 33 through which the via 13a passes without connecting to the wiring layer 31.

Third Embodiment

Figure 12A:
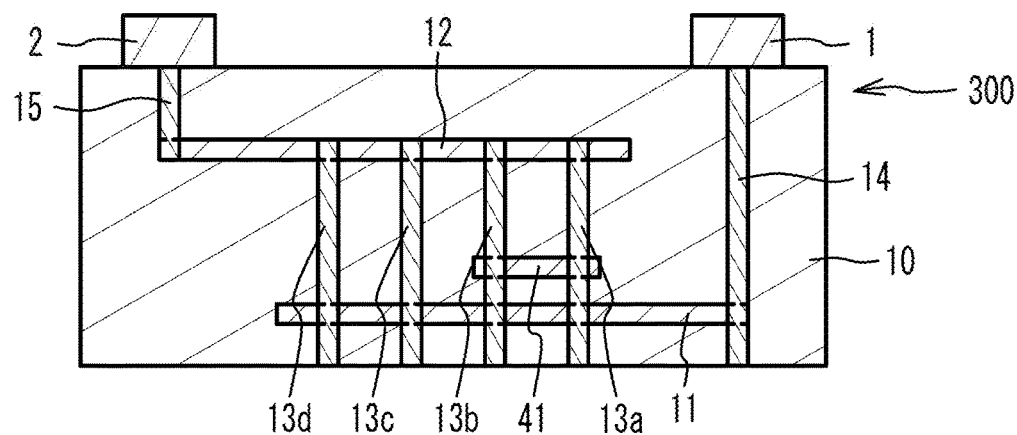
FIG. 12A is a cross-sectional view of a substrate in accordance with a third embodiment.
Figure 12B:
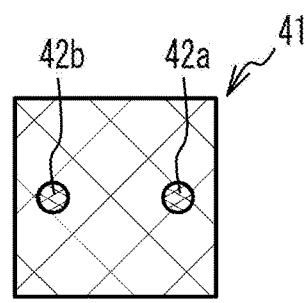
FIG. 12B through FIG. 12D are plan views of wiring layers.
Figure 12C:
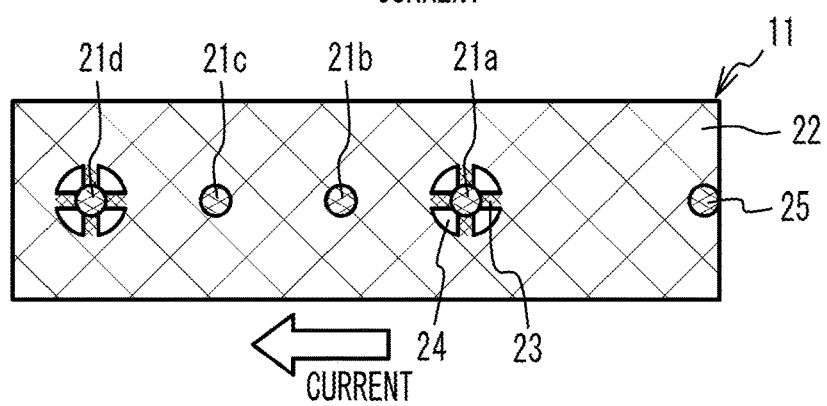
Figure 12D:
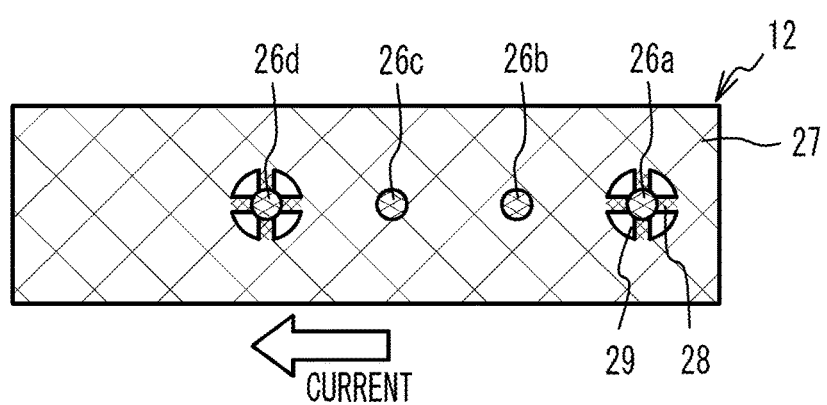

FIG. 12A is a cross-sectional view of a substrate 300 in accordance with a third embodiment, FIG. 12B is a plan view of a wiring layer 41, FIG. 12C is a plan view of the wiring layer 11, and FIG. 12D is a plan view of the wiring layer 12. As illustrated in FIG. 12A through FIG. 12D, in the substrate 300 of the third embodiment, in addition to the wiring layers 11 and 12, the wiring layer 41 is provided in the insulating film 10. The wiring layer 41 is connected to the vias 13a and 13b, and is not connected to the remaining vias, such as the vias 13c, 13d, and 14, located in the insulating film 10. When the parts connecting to the wiring layer 41 of the vias 13a and 13b are respectively defined as connection parts 42a and 42b, the entire peripheral surfaces of the connection parts 42a and 42b are connected to the wiring layer 41. Other structures are the same as those of the first embodiment, and the description thereof is thus omitted.

The third embodiment provides the wiring layer 41 that is connected to the via 13a located more upstream in the flow direction of current of the vias at both ends and at least one via 13b of the vias 13b and 13c located at other than both ends, and is not connected to the remaining vias. Since the connection part 42b connecting to the wiring layer 41 of the via 13b is located further downstream than the connection part 42a connecting to the wiring layer 41 of the via 13a, the electric potential of the connection part 42b is lower than the electric potential of the connection part 42a. Thus, the provision of the wiring layer 41 causes a part of the current flowing through the via 13a to flow through the via 13b. Thus, the emergence of the via into which the current crowds is effectively inhibited.

Fourth Embodiment

Figure 13:
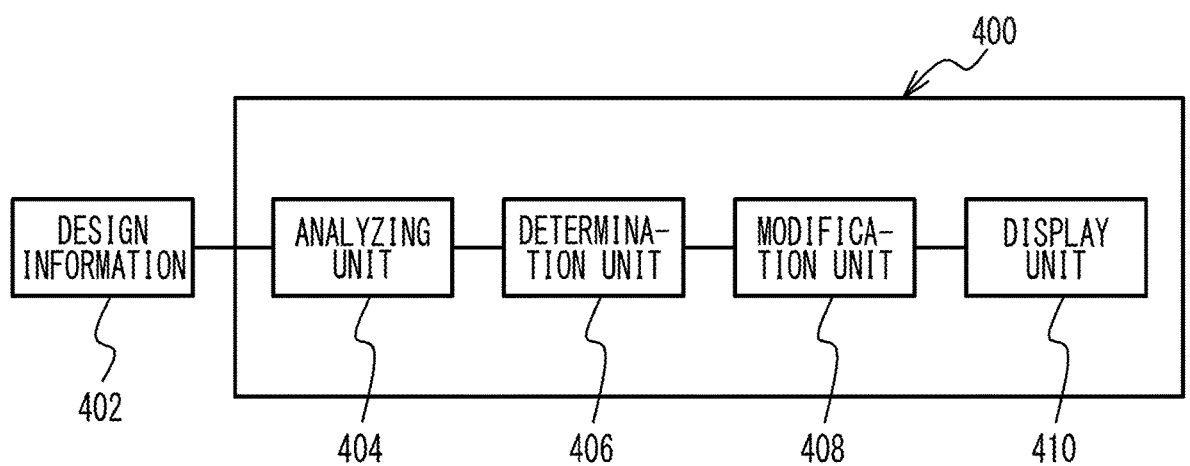
FIG. 13 is a block diagram illustrating a substrate design support device.

In a fourth embodiment, a design support method of a substrate will be described. FIG. 13 is a block diagram illustrating a substrate design support device. As illustrated in FIG. 13, design information 402 on a substrate is input to a substrate design support device 400 from a graphic processing system such as a CAD system. The substrate design support device 400 includes an analyzing unit 404, a determination unit 406, a modification unit 408, and a display unit 410.

Figure 14:
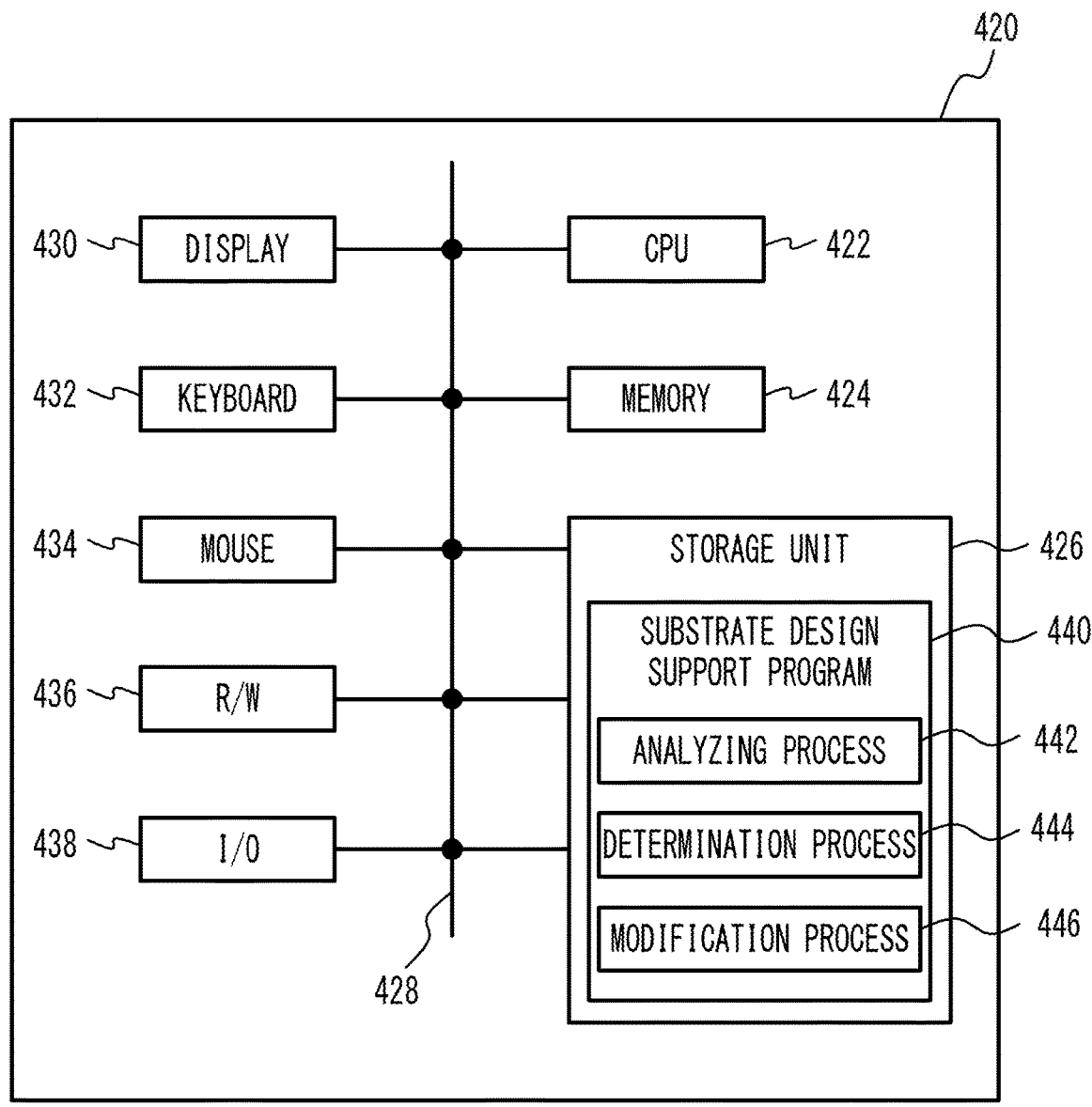
FIG. 14 is a block diagram when the substrate design support device is actualized by a computer.

FIG. 14 is a block diagram when the substrate design support device is actualized by a computer. A computer 420 includes a CPU 422, a memory 424, and a non-volatile storage unit 426. The CPU 422, the memory 424, and the storage unit 426 are interconnected through a bus 428. The computer 420 includes a display 430, a keyboard 432, and a mouse 434. The display 430, the keyboard 432, and the mouse 434 are interconnected through the bus 428. In addition, the computer 420 has an interface (I/O) 438 to connect to a computer network, and a device (R/W) 436 into which a storage medium is inserted and that writes and reads data to and from the storage medium. The interface (I/O) 438 and the device (R/W) 436 are connected to the bus 428. The storage unit 426 is, for example, a Hard Disk Drive (HDD) or a flash memory.

The storage unit 426 stores a substrate design support program 440 that causes the computer 420 to function as the substrate design support device 400. The substrate design support program 440 includes an analyzing process 442, a determination process 444, and a modification process 446. When the CPU 422 reads the substrate design support program 440 from the storage unit 426, expands it in the memory 424, and executes the processes included in the substrate design support program 440, the computer 420 operates as the substrate design support device 400 illustrated in FIG. 13. The execution of the analyzing process 442 by the CPU 422 causes the computer 420 to operate as the analyzing unit 404 illustrated in FIG. 13, and the execution of the determination process 444 by the CPU 422 causes the computer 420 to operate as the determination unit 406 illustrated in FIG. 13. In addition, the execution of the modification process 446 by the CPU 422 causes the computer 420 to operate as the modification unit 408 illustrated in FIG. 13.

The storage unit 426 stores a CAD program that causes the computer 420 to function as a graphic processing system such as a CAD system used in designing a printed circuit board or the like. In addition, the storage unit 426 stores a CAD file as design information created by causing the computer 420 to function as a graphic processing system.

Figure 15:
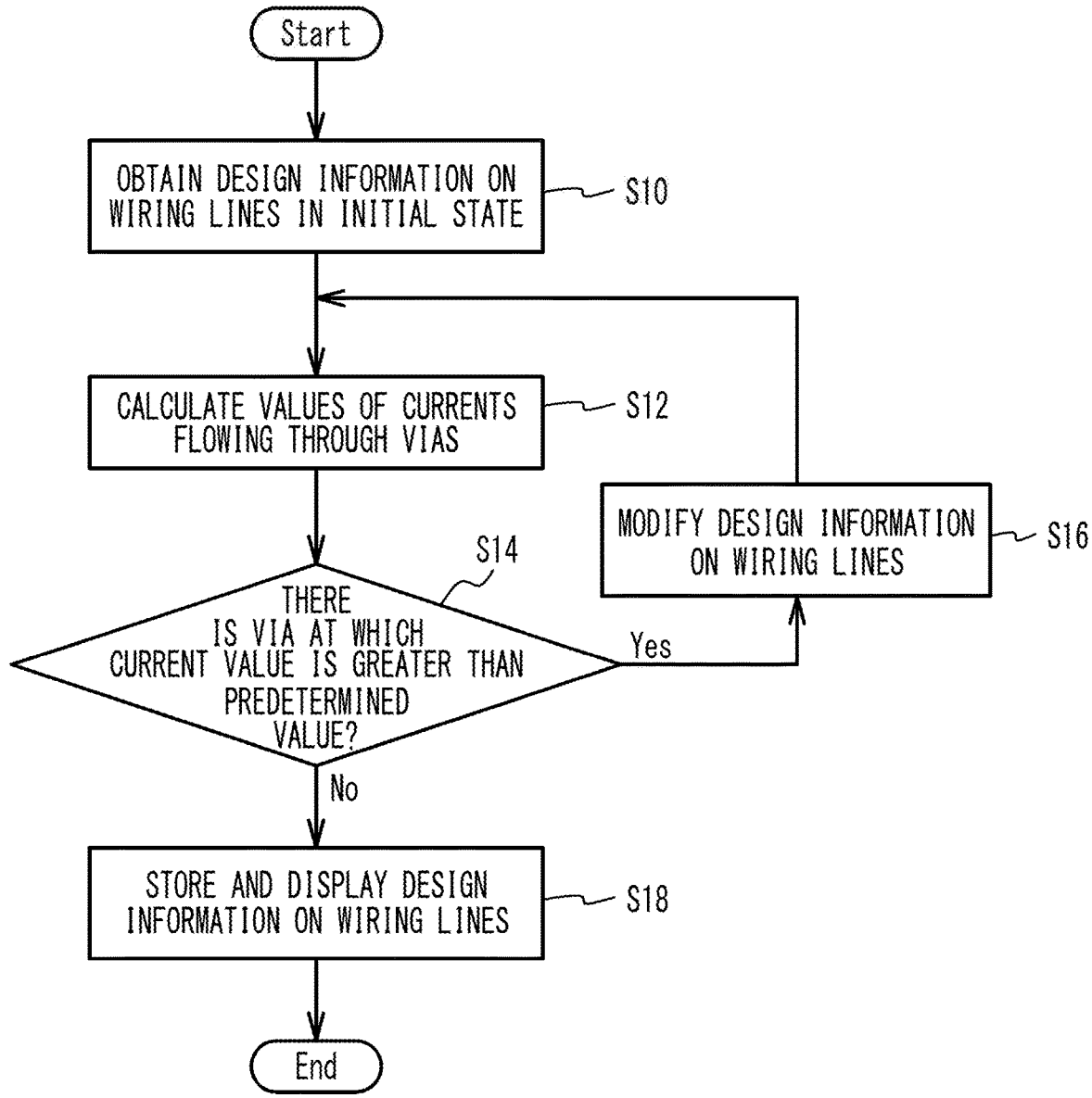
FIG. 15 is a flowchart illustrating a design support method of a substrate in accordance with a fourth embodiment.

FIG. 15 is a flowchart illustrating a design support method of a substrate in accordance with the fourth embodiment. Here, a case where the substrate 100 of the first embodiment is designed will be described as an example. As illustrated in FIG. 15, the CPU 422 obtains a CAD file including the design information on the substrate at step S10, and obtains the design information on a wiring line in the initial state for the wiring line of the substrate. The design information on the wiring line in the initial state is, for example, design information on the wiring layers 11 and 12 and the vias 13a through 13d in FIG. 1A through FIG. 1C.

Then, the CPU 422 moves to step S12, and calculates the values of the currents flowing from the wiring layer 11 toward the vias 13a through 13d. The values of the currents flowing through the vias 13a through 13d may be calculated by, for example, the nodal analysis method. The maximum total amount of the currents while the substrate 100 is being used may be used as the total amount of the currents flowing from the wiring layer 11 to the vias 13a through 13d.

Then, the CPU 422 moves to step S14, and the CPU 422 determines whether there is a via at which the current value is greater than the predetermined value among the vias 13a through 13d. The predetermined value is a threshold current value determining whether electromigration is to occur in a via, for example, and is stored in the storage unit 426. As described in the first embodiment, since the current crowds into the vias 13a and 13d at both ends, it is expected that the current values at the vias 13a and 13d at both ends are greater than the predetermined value.

When there is a via at which the current value is greater than the predetermined value (step S14: Yes), the process moves to step S16. At step S16, the CPU 422 modifies the design information on the wiring layer 11 so that the cross-sectional area of the conductive portion 23 connecting to each of the connection parts 21a and 21d is reduced in the wiring layer 11. For example, the CPU 422 modifies the design information on the wiring layer 11 so that the cross-sectional area of the conductive portion 23 is reduced by decreasing the width of the conductive portion 23. In addition to modification of the design information on the wiring layer 11, the design information on the wiring layer 12 may be modified so that the cross-sectional area of the conductive portion 28 connecting to each of the connection parts 26a and 26d is reduced in the wiring layer 12.

After step S16, the CPU 422 moves to step S12, and obtains the values of the currents flowing through the vias 13a through 13d. When there is still a via at which the current value is greater than the predetermined value (step S14: Yes), the process moves to step S16 again. At step S16, the CPU 422 modifies the design information on the wiring layer 11 so that the cross-sectional area of the conductive portion 23 is further reduced. Steps S12 through S16 are repeated till all the current values at the vias 13a through 13d are equal to or less than the predetermined value.

When it is determined that all the current values at the vias 13a through 13d are equal to or less than the predetermined value (step S14: No), the CPU 422 moves to step S18, stores the design information on the wiring line at this time in the storage unit 426, displays the design information on the wiring line at this time on the display 430, and ends the process.

In the fourth embodiment, as illustrated in FIG. 15, the magnitudes of the currents flowing from the wiring layer 11 to the vias 13a through 13d are calculated (step S12). When there is a via at which the magnitude of the current is greater than the predetermined value among the vias 13a through 13d (step S14: Yes), the design information on the substrate 100 is modified so that the magnitudes of the currents flowing through the vias 13a through 13d are equal to or less than the predetermined value (step S16). More specifically, the design information on the substrate 100 is modified so that the magnitudes of the currents flowing through the vias 13a through 13d are equal to or less than the predetermined value by making the cross-sectional area of the conductive portion 23 connecting to each of the connection parts 21a and 21d less than each of the areas of the parts connecting to the connection parts 21b and 21c of the wiring layer 11. This configuration inhibits the emergence of the via into which the current crowds.

In the fifth embodiment, the design information on the substrate may be modified so that at least one of the wiring layer 31 described in the second embodiment and the wiring layer 41 described in the third embodiment is added so that the magnitudes of the currents flowing through the vias 13a through 13d are equal to or less than the predetermined value.

A case where the design support method of a substrate in the flowchart of FIG. 15 is implemented by the computer 420 has been described as an example, but does not intend to suggest any limitation. Various improvements and modifications may be made without departing from the gist described above. In addition, a case where the program is stored in the storage unit 426 in advance has been described as an example, but does not intend to suggest any limitation. The program may be provided in a form stored in a storage medium such as a CD-ROM or a DVD-ROM.

Fifth Embodiment

Figure 16A:
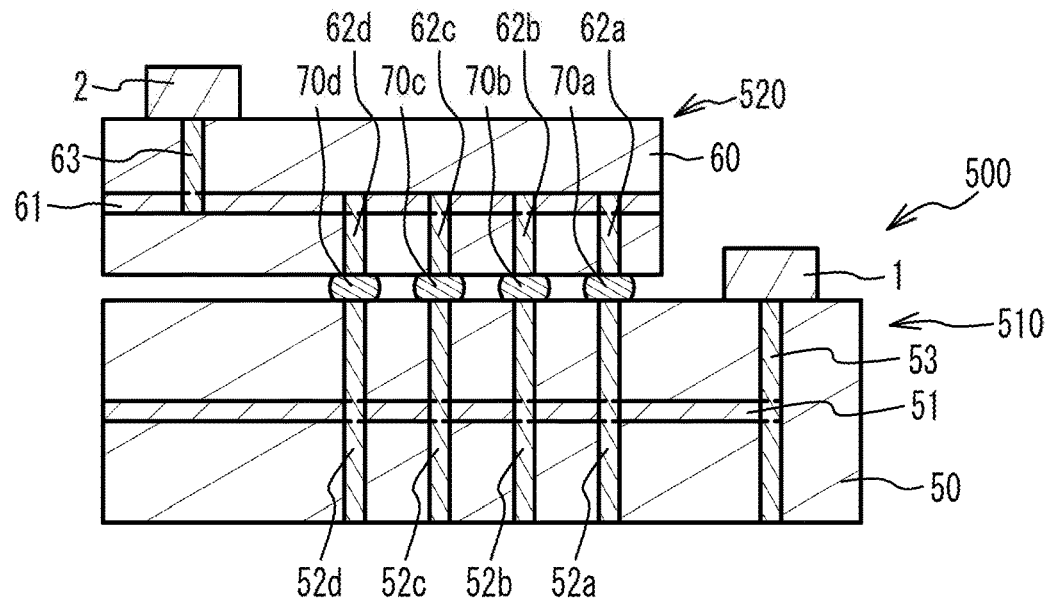
FIG. 16A is a cross-sectional view of an electronic device in accordance with a fifth embodiment.
Figure 16B:
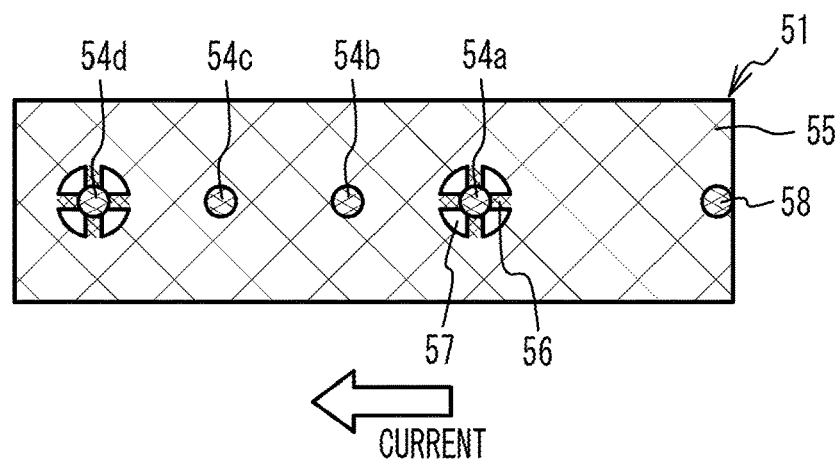
FIG. 16B and FIG. 16C are plan views of wiring layers.

FIG. 16A is a cross-sectional view of an electronic device 500 in accordance with a fifth embodiment, FIG. 16B is a plan view of a wiring layer 51 of a substrate 510, and FIG.

16C is a plan view of a wiring layer 61 of a substrate 520. As illustrated in FIG. 16A, in the electronic device 500 of the fifth embodiment, the substrate 520 is mounted on the substrate 510 by connection members 70a through 70d. The connection members 70a through 70d are, for example, bumps such as solder.

The substrate 510 is a printed circuit board in which one or more wiring layers are formed in an insulating film, and includes an insulating film 50, the wiring layer 51, and vias 52a through 52d and 53. The wiring layer 51 and the vias 52a through 52d and 53 are located in the insulating film 50. A first end part of the wiring layer 51 is connected to the via 53, and a second end part extends beyond the via 52d. The wiring layer 51 is electrically connected through the via 53 to the power supply unit 1 located on the substrate 510. The vias 52a through 52d are arranged in a straight line along the wiring direction of the wiring layer 51. The insulating film 50 is formed of, for example, a resin material such as epoxy or polyimide or a ceramic material such as aluminum oxide. The wiring layer 51 and the vias 52a through 52d and 53 are formed of metal such as, for example, gold or copper.

As illustrated in FIG. 16B, the parts connecting to the wiring layer 51 of the vias 52a through 52d are defined as connection parts 54a through 54d, respectively. The wiring layer 51 includes a wiring layer body 55 and conductive portions 56. The conductive portions 56 are formed by providing apertures 57 in the wiring layer body 55 around the connection parts 54a and 54d. The apertures 57 penetrate through, for example, the wiring layer body 55. Therefore, the connection parts 54a and 54d are connected to the wiring layer body 55 through the conductive portions 56. On the other hand, no aperture 57 is located around the connection parts 54b and 54c. Thus, the entire peripheral surfaces of the connection parts 54b and 54c are directly connected to the wiring layer body 55. As with the wiring layers 11 and 12 in the first embodiment, the cross-sectional area of the conductive portion 56 is less than the area of the part being in contact with the connection part 54b of the wiring layer body 55 and the area of the part being in contact with the connection part 54c of the wiring layer body 55. Thus, the electrical resistance between the wiring layer 51 and each of the vias 52a and 52d is higher than the electrical resistance between the wiring layer 51 and each of the vias 52b and 52c. The part connecting to the wiring layer 51 of the via 53 is defined as a connection part 58.

As illustrated in FIG. 16A, the substrate 520 is a printed circuit board in which one or more wiring layers are formed in an insulating film, and includes an insulating film 60, the wiring layer 61, and vias 62a through 62d and 63. The wiring layer 61 and the vias 62a through 62d and 63 are located in the insulating film 60. The wiring layer 61 is electrically connected through the via 63 to the electronic component 2 located on the substrate 520. The vias 62a through 62d are arranged in a straight line along the wiring direction of the wiring layer 61. The insulating film 60 is formed of, for example, a resin material such as, for example, epoxy or polyimide or a ceramic material such as aluminum oxide. The wiring layer 61 and the vias 62a through 62d and 63 are formed of metal such as, for example, gold or copper. The substrate 520 is not limited to a printed circuit board, and may be, for example, a semiconductor substrate in which a semiconductor element such as a transistor is formed.

Figure 16C:
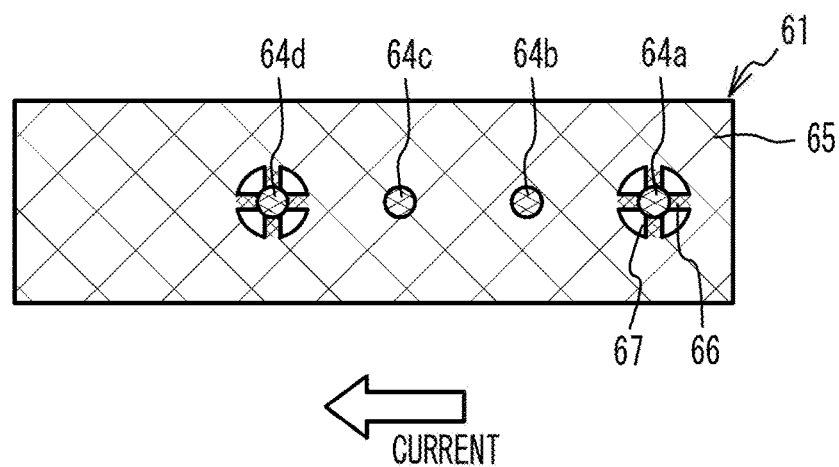

As illustrated in FIG. 16C, the parts connecting to the wiring layer 61 of the vias 62a through 62d are respectively defined as connection parts 64a through 64d. The wiring layer 61 includes a wiring layer body 65 and conductive portions 66. The conductive portions 66 are formed by providing apertures 67 in the wiring layer body 65 around the connection parts 64a and 64d. The aperture 67 penetrates through, for example, the wiring layer body 65. Thus, the connection parts 64a and 64d are coupled to the wiring layer body 65 through the conductive portions 66. On the other hand, no aperture 67 is located around the connection parts 64b and 64c. Thus, the entire peripheral surfaces of the connection parts 64b and 64c are directly connected to the wiring layer body 65. As with the wiring layers 11 and 12 of the first embodiment, the cross-sectional area of the conductive portion 66 is less than the area of the part being in contact with the connection part 64b of the wiring layer body 65 and the area of the part being in contact with the connection part 64c of the wiring layer body 65. Thus, the electrical resistance between the wiring layer 61 and each of the vias 62a and 62d is higher than the electrical resistance between the wiring layer 61 and each of the vias 62b and 62c.

As illustrated in FIG. 16A, the vias 52a through 52d of the substrate 510 and the vias 62a through 62d of the substrate 520 are connected by the connection members 70a through 70d. This structure mounts the substrate 520 on the substrate 510. The connection members 70a through 70d are arranged in a straight line along the wiring directions of the wiring layer 51 and the wiring layer 61. Since the wiring layer 51 is connected to the power supply unit 1, the current flows from the wiring layer 51 to the vias 52a through 52d, the connection members 70a through 70d, and the vias 62a through 62d. The current flowing through the vias 52a through 52d, the connection members 70a through 70d, and the vias 62a through 62d flows into the wiring layer 61, and is then supplied to the electronic component 2 connected to the wiring layer 61.

Figure 17A:
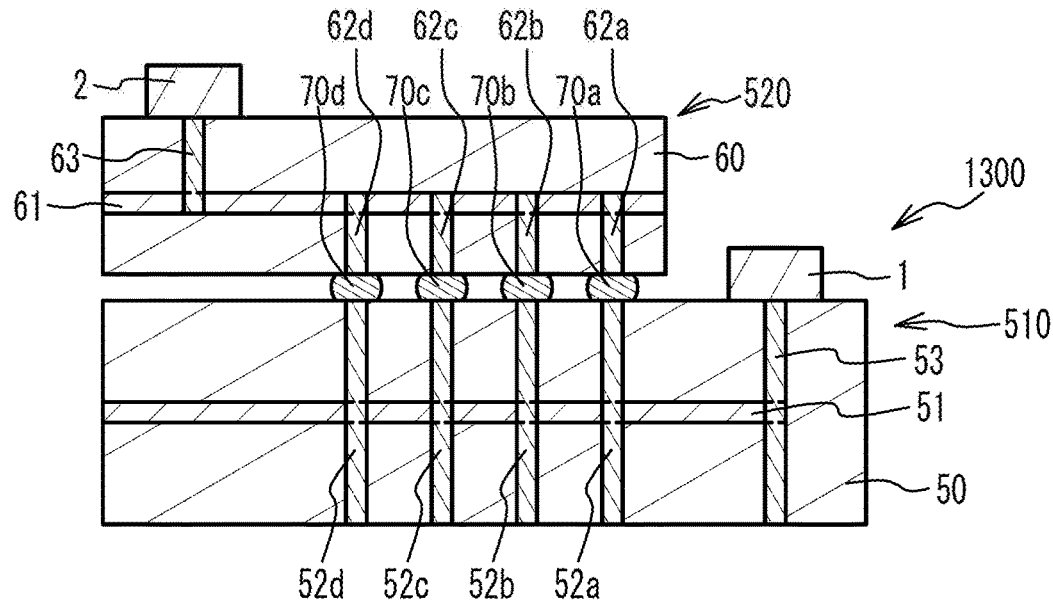
FIG. 17A is a cross-sectional view of an electronic device in accordance with a third comparative example.
Figure 17B:
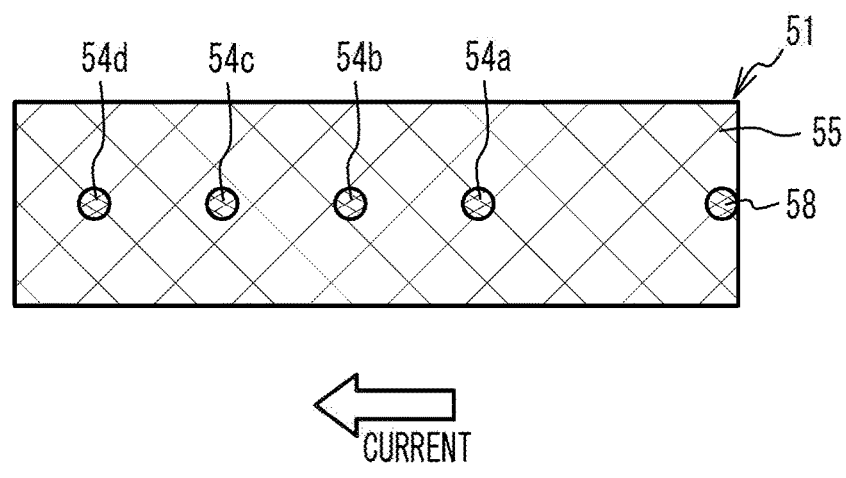
FIG. 17B and FIG. 17C are plan views of wiring layers.
Figure 17C:
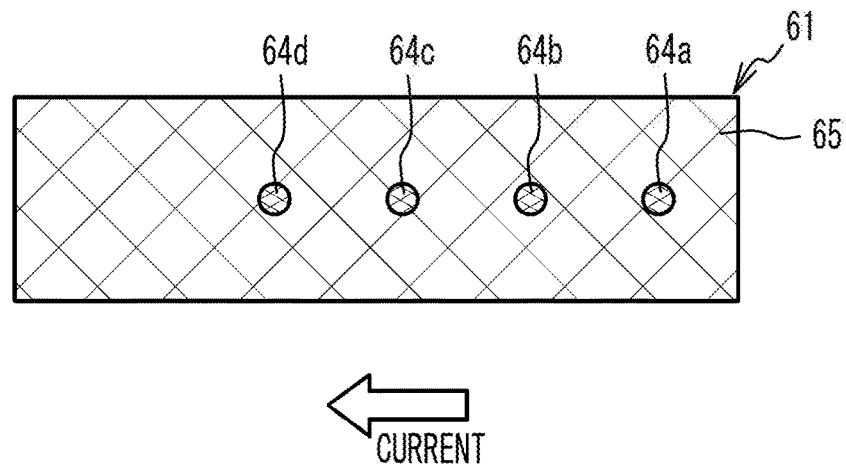

FIG. 17A is a cross-sectional view of an electronic device 1300 in accordance with a third comparative example, FIG. 17B is a plan view of the wiring layer 51 of the substrate 510, and FIG. 17C is a plan view of the wiring layer 61 of the substrate 520. As illustrated in FIG. 17A through FIG. 17C, in the electronic device 1300 of the third comparative example, no aperture 57 is provided around the connection parts 54a and 54d in the wiring layer 51 of the substrate 510, and no aperture 67 is provided around the connection parts 64a and 64d in the wiring layer 61 of the substrate 520. Other structures are the same as those of the sixth embodiment, and the description thereof is thus omitted.

In the electronic device 1300 of the third comparative example, for the same reason as the substrate 1000 of the first comparative example, the current flowing from the via 52a at the end to the via 62a through the connection member 70a and the current flowing from the via 52d at the end to the via 62d through the connection member 70d are large.

On the other hand, in the fifth embodiment, as illustrated in FIG. 16B, the connection parts 54a and 54d located closer to both ends of the wiring layer 51 among the connection parts 54a through 54d are coupled to the wiring layer body 55 through the conductive portions 56. In the wiring layer 51, the cross-sectional area of the conductive portion 56 is less than the area of the part being in contact the connection part 54b, which is located at other than both ends, of the wiring layer 51 and the area of the part being in contact the connection part 54c, which are located at other than both ends, of the wiring layer 51. Because of the same reason as the reason described in the first embodiment, it becomes difficult for the current to flow from the wiring layer 51 to the vias 52a and 52d. Thus, the emergence of the via and the connection member in which the current crowds is inhibited.

Therefore, a break due to electromigration is inhibited from occurring in the via and the connection member.

In the fifth embodiment, as in the second embodiment, the wiring layer 31 may be formed in the substrate 510. As in the third embodiment, the wiring layer 41 may be formed in the substrate 510. This structure effectively inhibits the emergence of the via into which the current crowds.

The fifth embodiment has described a case where both the connection parts 54a and 54d at both ends are coupled to the wiring layer body 55 through the conductive portions 56 as illustrated in FIG. 16B, as an example. However, it is sufficient if at least one of the connection parts 54a and 54d is coupled to the wiring layer body 55 through the conductive portion 56. This structure inhibits the emergence of the via and the connection member into which the current crowds. Similarly, a case where both the connection parts 64a and 64d at both ends are coupled to the wiring layer body 65 through the conductive portions 66 as illustrated in FIG. 16C has been described as an example, but it is sufficient if at least one of the connection parts 64a and 64d is coupled to the wiring layer body 65 through the conductive portion 66. This structure further inhibits the emergence of the via and the connection member in which the flow of a current concentrates.

Sixth Embodiment

Figure 18A:
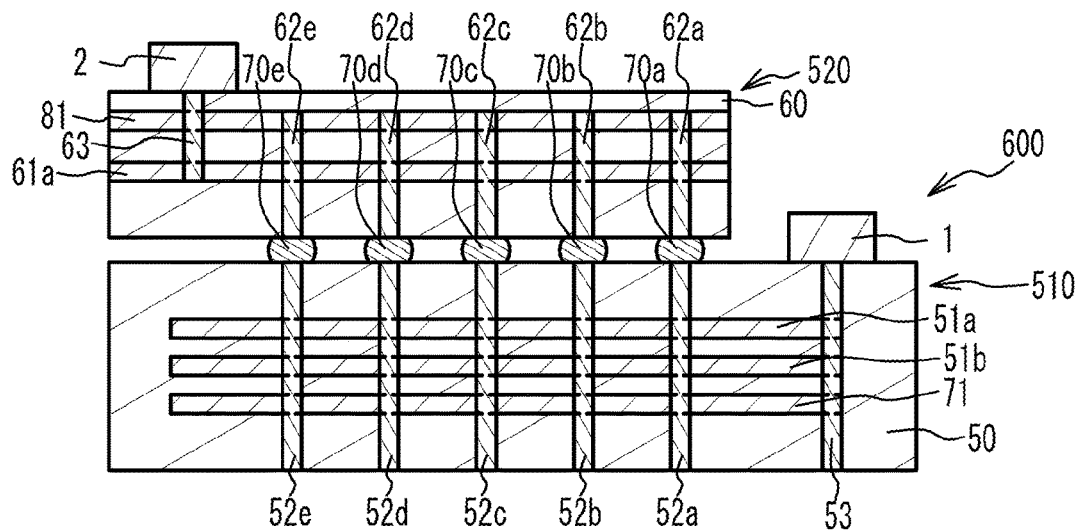
FIG. 18A is a cross-sectional view of an electronic device in accordance with a sixth embodiment.
Figure 18B:
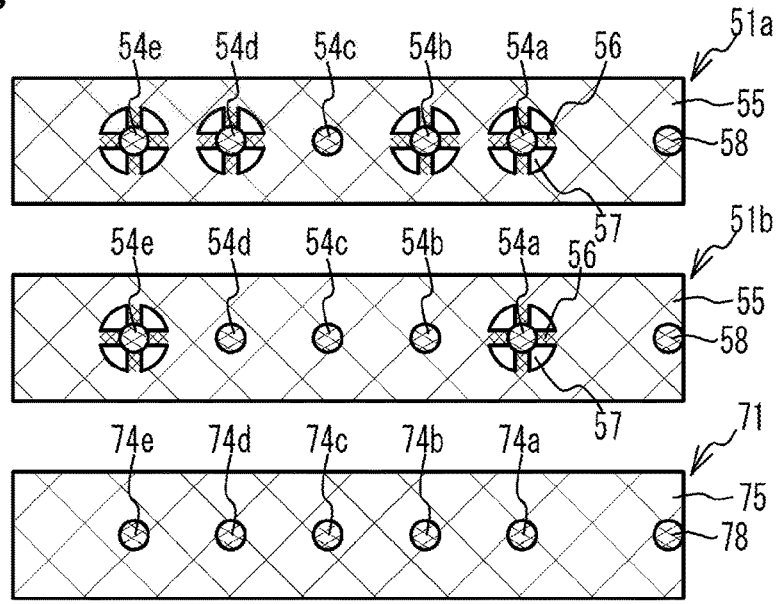
FIG. 18B and FIG. 18C are plan views of wiring layers.
Figure 18C:
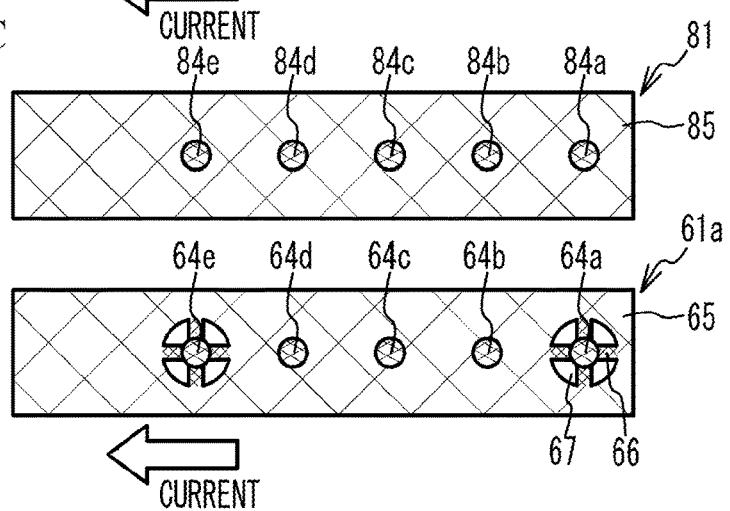

FIG. 18A is a cross-sectional view of an electronic device 600 in accordance with a sixth embodiment, FIG. 18B is a plan view of wiring layers 51a, 51b, and 71 of the substrate 510, and FIG. 18C is a plan view of wiring layers 81 and 61a of the substrate 520. As illustrated in FIG. 18A through FIG. 18C, in the electronic device 600 of the sixth embodiment, the substrate 510 has the wiring layers 51a, 51b, and 71 stacked in the insulating film 50, and the substrate 520 has the wiring layers 61a and 81 stacked in the insulating film 60.

In the wiring layer 51a of the substrate 510, the connection parts 54a, 54b, 54d, and 54e connecting to the wiring layer 51a of the vias 52a, 52b, 52d, and 52e are coupled to the wiring layer body 55 through the conductive portions 56. The entire peripheral surface of the connection part 54c connecting to the wiring layer 51a of the via 52c is directly connected to the wiring layer body 55. In the wiring layer 51b, the connection parts 54a and 54e connecting to the wiring layer 51b of the vias 52a and 52e are coupled to the wiring layer body 55 through the conductive portions 56. The entire peripheral surfaces of the connection parts 54b through 54d connecting to the wiring layer 51b of the vias 52b through 52d are directly connected to the wiring layer body 55. In the wiring layer 71, the entire peripheral surfaces of connection parts 74a through 74e connecting to the wiring layer 71 of the vias 52a through 52e are directly connected to a wiring layer body 75. The part connecting to the wiring layer 71 of the via 53 is defined as a connection part 78.

In the wiring layer 81 of the substrate 520, the entire peripheral surfaces of connection parts 84a through 84e connecting to the wiring layer 81 of the vias 62a through 62e are directly connected to a wiring layer body 85. In the wiring layer 61a, the connection parts 64a and 64e connecting to the wiring layer 61a of the vias 62a and 62e are coupled to the wiring layer body 65 through the conductive portions 66. The entire peripheral surfaces of the connection parts 64b through 64d connecting to the wiring layer 61a of the vias 62b through 62d are directly connected to the wiring layer body 65.

In the sixth embodiment, the sum of the areas of the parts connecting to the wiring layers 51a, 51b, and 71 is the smallest at the vias 52a and 52e at both ends, and becomes larger as the via is located further inner among the vias 52a through 52e of the substrate 510. This structure allows the current to effectively evenly flow through the vias 52a through 52e.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A substrate including a first wiring layer, a second wiring, and a third wiring layer, the first wiring layer has a structure in which among a plurality of first connection parts of a plurality of vias, at least one of first connection parts of two vias located closer to both ends of the first wiring layer in a length direction of the first wiring layer is coupled to a body of the first wiring layer through a first conductive portion, each of the plurality of first connection parts being coupled to the first wiring layer, each of the plurality of first connection parts having a same shape in plan view as a part where a corresponding via is in contact with the first wiring layer, and a cross-sectional area with respect to a thickness direction of the first wiring layer of the first conductive portion is less than an area with respect to the thickness direction of the first wiring layer of a first part of the first wiring layer, the first part being in contact with a first connection part of a via other than the first connection parts of the two vias, the second wiring layer that is connected to at least one of a via other than the two vias and has a structure in which an insertion hole through which at least one of the two vias pass without being connected to the second wiring layer is provided, and the third wiring layer that is coupled to the first wiring layer through the plurality of vias and has a structure in which among a plurality of second connection parts of the plurality of vias, at least one of second connection parts of two vias located closer to both ends of the third wiring layer in a length direction of the third wiring layer is coupled to a body of the third wiring layer through a second conductive portion, each of the plurality of second connection parts being coupled to the third wiring layer, each of the plurality of second connection parts having a same shape in plan view as a part where a corresponding via is in contact with the third wiring layer, and a cross-sectional area with respect to a thickness direction of the third wiring layer of the second conductive portion is less than an area with respect to a thickness direction of the third wiring layer of a second part of the third wiring layer, the second part being in contact with a second connection part of a via other than the second connection parts of the two vias.

2. The substrate according to claim 1, wherein
at least one of the first connection parts of the two vias located closer to both ends of the first wiring layer in the length direction of the first wiring layer is coupled to the body of the first wiring layer through a plurality of the first conductive portions, and
a sum of cross-section areas with respect to the thickness direction of the first wiring layer of the plurality of the first conductive portions is less than the area with respect to the thickness direction of the first wiring layer of the first part of the first wiring layer.

3. The substrate according to claim 1, wherein the first conductive portion is formed by providing an aperture a first connection part of a corresponding via.

4. The substrate according to claim 3, wherein one end of the first conductive portion is directly connected to one of the first connection parts of two vias, and the other end of the first conductive portion is directly connected to the body of the first wiring layer.

5. The substrate according to claim 1, wherein the first wiring layer is coupled to a power supply unit through a via.

6. The substrate according to claim 1, wherein the second wiring layer is coupled to a power supply unit through a via.

7. The substrate according to claim 1, wherein the first wiring layer is a power supply layer to which current is supplied from a power supply unit, or a ground layer into which the current flows.

8. The substrate according to claim 1, wherein
the substrate is coupled to another substrate, and
the plurality of vias extend toward the another substrate.

9. The substrate according to claim 1, wherein the substrate further includes a fourth wiring layer, the fourth wiring layer being connected to a via located more upstream in a flow direction of current of the two vias and at least one of a via other than the two vias, the fourth wiring layer not being connected to vias other than the via located more upstream in the flow direction of current of the two vias and the at least one of the via other than the two vias.

10. The substrate according to claim 1, wherein the first part of the first wiring layer is along an outer periphery of the first connection part of the via other than the first connection parts of the two vias.

11. An electronic device including a first substrate including a first wiring layer, a second wiring, and a third wiring layer, and a second substrate coupled to the first substrate, the first wiring layer has a structure in which
among a plurality of first connection parts of a plurality of vias extending toward the second substrate, at least one of first connection parts of two vias located closer to both ends of the first wiring layer in a length direction of the first wiring layer is coupled to a body of the first wiring layer through a first conductive portion, each of the plurality of first connection parts being coupled to the first wiring layer, each of the plurality of first connection parts having a same shape in plan view as a part where a corresponding via is in contact with the first wiring layer, and
a cross-sectional area with respect to a thickness direction of the first wiring layer of the first conductive portion is less than an area with respect to the thickness direction of the first wiring layer of a first part of the first wiring layer, the first part being in contact with a first connection part of a via other than the first connection parts of the two vias,
the second wiring layer that is connected to at least one of a via other than the two vias and has a structure in which an insertion hole through which at least one of the two vias pass without being connected to the second wiring layer is provided, and
the third wiring layer that is coupled to the first wiring layer through the plurality of vias and has a structure in which
among a plurality of second connection parts of the plurality of vias, at least one of second connection parts of two vias located closer to both ends of the third wiring layer in a length direction of the third wiring layer is coupled to a body of the third wiring layer through a second conductive portion, each of the plurality of second connection parts being coupled to the third wiring layer, each of the plurality of second connection parts having a same shape in plan view as a part where a corresponding via is in contact with the third wiring layer, and
a cross-sectional area with respect to a thickness direction of the third wiring layer of the second conductive portion is less than an area with respect to a thickness direction of the third wiring layer of a second part of the third wiring layer, the second part being in contact with a second connection part of a via other than the second connection parts of the two vias.

12. A substrate including a first wiring layer, a second wiring, and a third wiring layer, the first wiring layer has a structure in which
among a plurality of first connection parts of a plurality of vias, at least one of first connection parts of two vias located closer to both ends of the first wiring layer in a length direction of the first wiring layer is coupled to a body of the first wiring layer through a first conductive portion, each of the plurality of first connection parts being coupled to the first wiring layer, each of the plurality of first connection parts having a same shape in plan view as a part where a corresponding via is in contact with the first wiring layer, and
a cross-sectional area with respect to a thickness direction of the first wiring layer of the first conductive portion is less than an area with respect to the thickness direction of the first wiring layer of a first part of the first wiring layer, the first part being in contact with a first connection part of a via other than the first connection parts of the two vias,
the second wiring layer is connected to a via located more upstream in a flow direction of current of the two vias and at least one of a via other than the two vias, and is not connected to vias other than the via located more upstream in a flow direction of current of the two vias and the at least one of the via other than the two vias, and
the third wiring layer that is coupled to the first wiring layer through the plurality of vias and has a structure in which
among a plurality of second connection parts of the plurality of vias, at least one of second connection parts of two vias located closer to both ends of the third wiring layer in a length direction of the third wiring layer is coupled to a body of the third wiring layer through a second conductive portion, each of the plurality of second connection parts being coupled to the third wiring layer, each of the plurality of second connection parts having a same shape in plan view as a part where a corresponding via is in contact with the third wiring layer, and
a cross-sectional area with respect to a thickness direction of the third wiring layer of the second conductive portion is less than an area with respect to a thickness direction of the third wiring layer of a second part of the third wiring layer, the second part being in contact with a second connection part of a via other than the second connection parts of the two vias.

* * * * *